US012465444B2

(12) United States Patent
Said et al.

(10) Patent No.: US 12,465,444 B2
(45) Date of Patent: Nov. 11, 2025

(54) AUTOMATED SYSTEM AND A METHOD FOR PERFORMING HAIR RESTORATION

(71) Applicant: SPIDER MEDICAL LTD., Nahariya (IL)

(72) Inventors: Inas Saleh Said, Haifa (IL); Ophir Regev Almog, Ramat Gan (IL); Avraham Saad, Nahariya (IL)

(73) Assignee: SPIDER MEDICAL LTD., Nahariya (IL)

( * ) Notice: Subject to any disclaimer, the term of this patent is extended or adjusted under 35 U.S.C. 154(b) by 632 days.

(21) Appl. No.: 17/763,292

(22) PCT Filed: Sep. 24, 2020

(86) PCT No.: PCT/IL2020/051047
§ 371 (c)(1),
(2) Date: Mar. 24, 2022

(87) PCT Pub. No.: WO2021/059279
PCT Pub. Date: Apr. 1, 2021

(65) Prior Publication Data
US 2022/0346896 A1 Nov. 3, 2022

Related U.S. Application Data

(60) Provisional application No. 62/906,134, filed on Sep. 26, 2019.

(51) Int. Cl.
*A61B 34/32* (2016.01)
*A61B 17/3205* (2006.01)
(Continued)

(52) U.S. Cl.
CPC ........ *A61B 34/32* (2016.02); *A61B 17/32053* (2013.01); *A61B 90/11* (2016.02);
(Continued)

(58) Field of Classification Search
CPC  A61B 2017/00752; A61B 2017/32053; A61B 2017/00216; A61B 34/30;
(Continued)

(56) References Cited

U.S. PATENT DOCUMENTS

| 6,585,746 B2 * | 7/2003 | Gildenberg | A61B 17/32053 |
| | | | 606/187 |
| 10,314,660 B2 | 6/2019 | Jung | |

(Continued)

OTHER PUBLICATIONS

International Search Report for PCT/IL2020/051047, mailed on Nov. 26, 2020 (7 pages).
(Continued)

*Primary Examiner* — Katherine H Schwiker
(74) *Attorney, Agent, or Firm* — Roach Brown McCarthy & Gruber, P.C.; Kevin D. McCarthy

(57) ABSTRACT

The invention relates to an automated system for performing hair restoration, which comprises automated harvest means, comprising a harvesting needle mechanism and a temporal storage means for harvested follicles; automated transplanting means, comprising a transplanting needle mechanism and a temporal storage means from which harvested follicles are extracted for transplantations; displacement means, onto which one of the automated harvest means or one of the automated transplanting means are movably connected for being displaced to desirable harvest or transplantation target points of a patient head; image acquisition means for acquiring images of a patient's scalp; mechanical support means for supporting and stabilizing the patient and particularly the patient's head during the restoration procedure; a control module, comprising suitable data processing and storage hardware and software configured to receive and process images acquired by the two or more image acquisition by image processing algorithms, map the initial patient's hair distribution, identify qualifying candidate follicles for trans-
(Continued)

plantation, and finally to generate an optimized harvest and transplantation plan considering aesthetic, efficiency and safety optimization parameters. The control module is further configured to operate the at least one automated harvest means, the at least one automated transplanting means and the at least one displacement means to harvest and to transplant hair follicles in accordance with the generated optimized harvest and transplantation plan.

21 Claims, 19 Drawing Sheets
(3 of 19 Drawing Sheet(s) Filed in Color)

(51) Int. Cl.
    *A61B 90/00*     (2016.01)
    *A61B 90/11*     (2016.01)
    *G06T 7/11*     (2017.01)
    *A61B 17/00*     (2006.01)

(52) U.S. Cl.
    CPC .............. *A61B 90/361* (2016.02); *G06T 7/11* (2017.01); *A61B 2017/00216* (2013.01); *A61B 2017/00752* (2013.01)

(58) Field of Classification Search
    CPC ....... A61B 34/32; A61B 90/11; A61B 90/361; G06T 7/11
    See application file for complete search history.

(56) References Cited

U.S. PATENT DOCUMENTS

| | | |
|---|---|---|
| 10,327,850 B2 | 6/2019 | Bodduluri et al. |
| 2007/0106306 A1* | 5/2007 | Bodduluri .............. A61B 34/70 606/133 |
| 2016/0193035 A1* | 7/2016 | Silva Ramos ..... A61B 17/3468 606/130 |
| 2018/0132892 A1 | 5/2018 | Oostman, Jr. |

OTHER PUBLICATIONS

Written Opinion of the International Searching Authority for PCT/IL2020/051047, mailed on Nov. 26, 2020 (5 pages).

\* cited by examiner

AUTOMATED SYSTEM AND A METHOD FOR PERFORMING HAIR RESTORATION

FIELD OF THE INVENTION

The present invention relates to the field of hair transplant. More particularly, the present invention relates to an automated system and method for hair restoration.

BACKGROUND OF THE INVENTION

Hair transplantation requires identification and selection of the optimal donor area, optimal donated area for transplantation, detection of high quality follicles and follicle harvesting. After harvesting, the process requires temporary storage and transfer of the selected follicles from the donor area to a transplantation mechanism, which replants them in the donated area (the transplantation area), where desirably the transplantation process is aimed to achieve a uniform aesthetic distribution across the patient's scalp.

In the conventional methods of hair transplantation, the transplantation process is performed either manually or semi-automatically. The manual process involves visual inspection and selection of a particular donor area, identifying and harvesting selected follicles manually, i.e. sorting them with the eyes, storing the follicles in a chemical solution to preserve the grafts when they are outside of the body awaiting transplantation, and later, the best stored follicles are selected for transplantation.

During the prolonged manual process which takes a lot of time, the patient must remain seated restrained to the chair, so that the patient's head does not move, both during the follicles removal from the donor area and during the transfer to the donated area. The manual process is cumbersome, very uncomfortable to the patient and can endure many hours to complete, resulting in deteriorating quality as surgery time elapses due to tiredness of the operating team.

Another problem with manual transplantation process arises from the fact that there are inclined follicles from which the hair grows inclined with respect to the patient's scalp surface. These inclined follicles are more difficult to harvest manually.

In addition, in the process of manual hair transplantation, repetitive insertion of each transplanted follicle into the scalp skin in a corresponding angle with local scalp surface inclination is very difficult, as well, which risks the natural straight hair growth in the donated area. This problem is even aggravated for certain types of hair, such as curly hair and as such, partially excludes certain groups of population (e.g., Africans, Afro-Americans, etc.). The process for these certain groups requires shaving and therefore, transplantation of long hair is limited.

The hair transplantation process should also be optimized so as to prevent baldness in the donor area. While sufficient number of qualifying follicles for transplantation should be harvested from donor areas, enough hair should remain in the donor site to prevent creation of baldness.

Manual hair transplantation lacks pre-planning means, adding recurring manual evaluation and decision steps to the process which takes long time from the moment the follicles were harvested until their transplant in the donated area. During that time, the patient feels very uncomfortable and harvested follicles' quality deteriorates.

Furthermore, during the transplantation procedure, the presence of blood covering target transplantation points requires recurring cleaning of the area by the surgeon for enabling clear view of the target area, which consumes extended procedure time.

Moreover, existing hair restoration processes either rely on a surgeon's vision and aesthetic sense as far as selecting qualifying follicles for transplantation, while avoiding excess or non-uniform harvesting from donor area and/or insufficient transplantation of hair into target thin haired areas. Assistive optical means may improve the surgeon's vision capability, yet do not provide uniform distribution planning capability.

Both manual and semi-automatic processes use a uniformly distributed pattern plate to transplant the harvested follicle efficiently. However, using uniformly distributed pattern plate doesn't takes into account the initial specific hair distribution in the transplant target area of an individual patient, so eventually the transplanted area will not be suited to a the specific patient.

Currently, there is no available solution of automatic hair transplantation, which overcomes the deficiencies of prior art solutions.

It is therefore an object of the present invention to provide a system and method for hair transplantation based on optimal follicles selection from a donor area, to be transplanted in the donated area.

It is another object of the present invention to provide a system and method for hair transplantation based on distribution optimization of follicles, enabling uniform distribution of hair while avoiding undesirable thinning of hair.

It is another object of the present invention to provide a system and method for hair transplantation based on further optimizations that reduce the restoration procedure duration.

It is a further object of the present invention to provide a system and method for hair transplant with a fully automatic transplant process.

Other objects and advantages of the invention will become apparent as the description proceeds.

SUMMARY OF THE INVENTION

The invention relates to an automated system for performing hair restoration, comprising:
- at least one automated harvest means, comprising a harvesting needle mechanism and a temporal storage means for harvested follicles;
- at least one automated transplanting means, comprising a transplanting needle mechanism and a temporal storage means from which harvested follicles are extracted for transplantations;
- at least one displacement means, onto which one of the at least one automated harvest means or one of the at least one automated transplanting means are movably connected for being displaced to desirable harvest or transplantation target points of a patient head;
- two or more image acquisition means for acquiring images of a patient's scalp;
- one or more mechanical support means for supporting and stabilizing the patient and particularly the patient's head during the restoration procedure; and
- a control module, comprising suitable data processing and storage hardware and software configured to receive and process images acquired by the two or more image acquisition by image processing algorithms, map the initial patient's hair distribution, identify qualifying candidate follicles for transplantation, and finally to generate an optimized harvest and transplantation plan considering aesthetic, efficiency and safety optimization parameters, wherein the control module is further configured to operate the at least one automated harvest means, the at least one automated transplanting means and the at least one displacement means to harvest and to transplant hair follicles in accordance with the generated optimized harvest and transplantation plan.

According to an embodiment of the invention, the one or more mechanical support means comprise a chair with a backrest, on which the patient sits during restoration procedure, and at least two fixation means for holding the patient's head stabilized during restoration procedure.

According to an embodiment of the invention, the proposed system further comprises a Human Machine Interface device through which the system can be managed, maintained and operated manually where needed.

According to an embodiment of the invention, pairs of the at least one automated harvest means and of the at least one automated transplanting means are integrated into one or more automated harvest and transplanting heads performing both operations, where the one or more automated harvest and transplanting means comprises a harvesting needle mechanism, a transplanting needle mechanism, and a temporal storage means for storing one or more harvested follicles until transplanting thereof.

According to an embodiment of the invention, the temporal storage means is a rotatable carousel comprising a plurality of follicle capsules, wherein by rotating the rotatable carousel a desirable capsule is being aligned with a harvesting needle mechanism for receiving and storing a harvested follicle, or an occupied capsule is being aligned with a transplanting needle mechanism enabling a stored follicle to be picked by the transplanting needle mechanism to be transplanted.

According to an embodiment of the invention, the proposed system further comprises a capsule cleaning means for cleaning each capsule after use.

According to an embodiment of the invention, the cleaning means is an air pipe ending with a nozzle which blows air for cleaning an emptied capsule.

According to an embodiment of the invention, the one or more automated harvest and transplanting heads employs a follicle camera for monitoring the status of stored follicles, and for verifying harvesting and transplantation locations.

According to an embodiment of the invention, the at least one displacement means is a robotic arm.

According to an embodiment of the invention, the at least one displacement means is an one or more rail guided trolleys configured to travel in a guiding rail of an omega shaped rotatable guiding rails arch comprising one or more guiding rails.

According to an embodiment of the invention, two or more of the one or more rail guided trolleys are configured to travel within the same guiding rail, wherein a first rail guided trolley onto which an automated harvest means is configured to perform harvest operation, and to relay the harvested follicle to a second rail guided trolley onto which an automated transplanting means is movably connected.

According to an embodiment of the invention, the proposed system further comprises assistive monitoring and guiding means providing visual supervision of the restoration procedure, and guiding means for guiding harvest and transplanting operations of the system.

According to an embodiment of the invention, the assistive monitoring and guiding means are selected from the group consisting of: laser marking means, augmented reality headset, or any combination thereof.

According to an embodiment of the invention, the two or more image acquisition means comprise a scanning camera for acquiring two-dimensional images and a formation of two local cameras uniformly directed to a patient's head while 60% of fields of view thereof overlap, wherein the control module is configured to perform an integrated photogrammetric processing of images acquired by the formation of two local cameras, thereby to generate spatial positioning information of each individual hair, for mapping of a patient's scalp and hair deployment.

According to an embodiment of the invention, the harvesting needle mechanism comprises harvesting needle which concentrically moves inside a sharpened sleeve that functions as a drill for uprooting follicles.

According to an embodiment of the invention, the transplanting needle mechanism comprises a transplanting needle which is concentrically slide inside a sharpened sleeve that functions as a linear guide for directing harvested follicles to points of insertion in the donated area.

The invention also relates to a method for performing hair restoration, comprising:

Providing at least one automated harvest means, comprising a harvesting needle mechanism and a temporal storage means for harvested follicles;

Providing at least one automated transplanting means, comprising a transplanting needle mechanism and a temporal storage means from which harvested follicles are extracted for transplantations;

Providing at least one displacement means, onto which one of the at least one automated harvest means or one of the at least one automated transplanting means are movably connected for being displaced to desirable harvest or transplantation target points of a patient head;

Providing two or more image acquisition means for acquiring images of a patient's scalp;

Providing one or more mechanical support means for supporting and stabilizing the patient and particularly the patient's head during the restoration procedure; and Providing a control module, which controls the provided;

Stably positioning a patient to be supported by the one or more mechanical support means;

Scanning the patient's head by the two or more image acquisition means for collecting inclusive imaging of the patient's scalp;

Processing acquired images by image processing algorithms executed by the control module for identifying scalp bald areas, thin haired areas, dense haired areas, as well as identifying qualifying candidate follicles for transplantation, thereby generating an initial mapping of the patient's scalp;

Generating an optimized harvest and transplantation plan considering aesthetic, efficiency and safety optimization parameters, by executing corresponding optimization algorithms;

Operating the at least one automated harvest means, the at least one automated transplanting means and the at least one displacement means to harvest and to transplant hair follicles in accordance with the generated optimized harvest and transplantation plan, while repeating steps h)-i) until the mapping of the patient's scalp at step i) is optimized.

According to an embodiment of the invention, the identifying qualifying candidate follicles for transplantation is performed by using image processing algorithms for characterizing each identified follicle followed by ranking the characterized follicles, where the highest ranked follicles are considered as candidates for transplantation.

According to an embodiment of the invention, the follicles are characterized with respect to parameters selected from the group consisting of: hair thickness, hair darkness, hair angle with respect to the patient's scalp, or any combination thereof.

According to an embodiment of the invention, the aesthetic optimization parameters are selected from the group consisting of: uniform hair distribution, hair shade, or any combination thereof.

According to an embodiment of the invention, the efficiency optimization parameters are selected from the group consisting of: minimum possible displacement of follicles, minimizing displacement path conflicts, or any combination thereof.

According to an embodiment of the invention, the safety optimization algorithm constantly calculates the instantaneous distance between the closest portions of moving and stationary components of the restoration system, in order to maintain a minimal distance which exceeds a predetermined safety distance, so as to prevent any potential collision.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other characteristics and advantages of the invention will be better understood through the following illustrative and non-limitative detailed description of preferred embodiments thereof, with reference to the appended drawings, wherein.

DETAILED DESCRIPTION OF THE PRESENT INVENTION

The present invention proposes an automated system and a method for performing hair restoration, which is configured to optimize the transplantation process by utilizing image processing techniques for mapping existing hair distribution of an individual patient's head, and for identifying dense haired areas populated by qualifying hair follicles for transplantation in identified thin haired and bold scalp areas uniformly in an efficient manner, by utilizing distribution optimization techniques and transfer path optimization of each donated follicle.

Reference will now be made to several embodiments of the present invention, examples of which are illustrated in the accompanying figures for purposes of illustration only. One skilled in the art will readily recognize from the following description that alternative embodiments of the system and methods illustrated herein may be employed without departing from the principles of claimed invention. Moreover, the following discussion is intended to provide a brief, general description of a suitable computing environment adapted to be implemented in the proposed system. While part of the invention will be described in the general context of program modules or codes that execute in conjunction with an application program that runs on a computer system, those skilled in the art will recognize that the invention may also be implemented in combination with other program modules. The functions described herein may be performed by executable code and instructions stored in computer readable medium and running on one or more processor-based systems.

Figure 1:
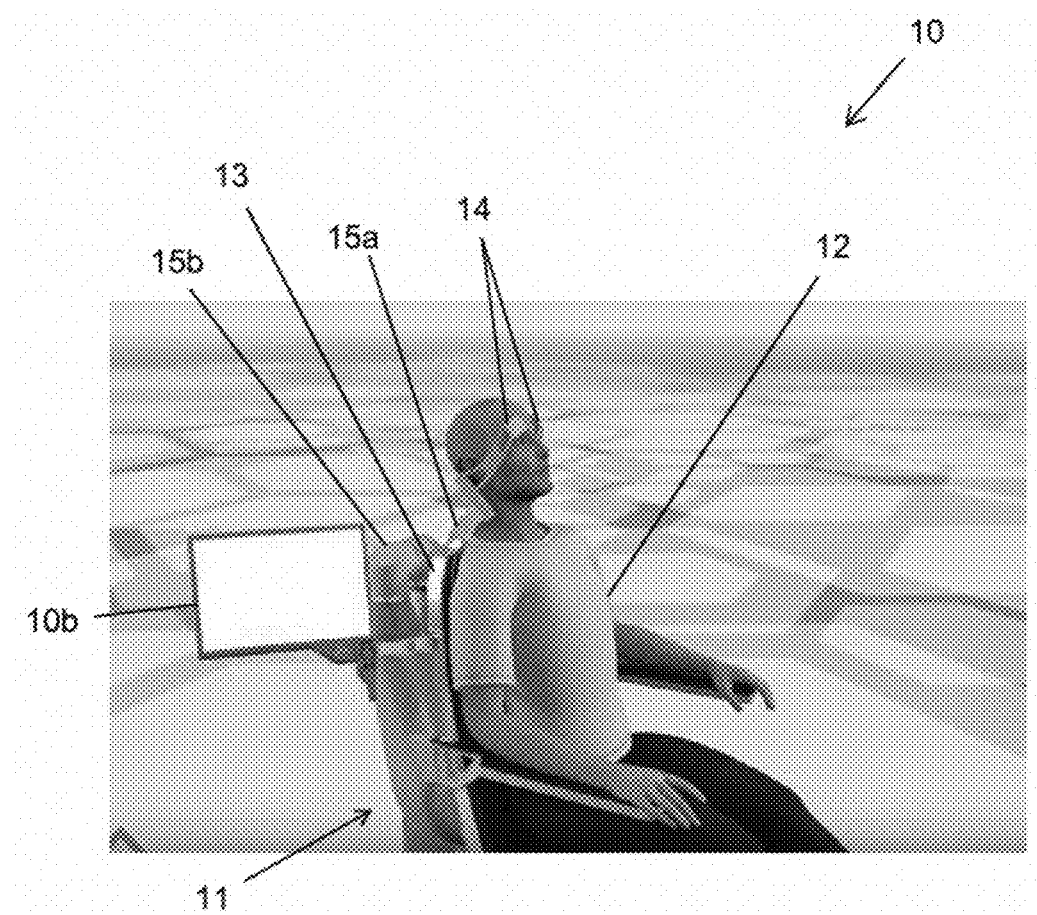
FIG. 1 shows a front view of an automated hair restoration system, according to an embodiment of the present invention.

FIG. 1 shows a front view of an automated hair restoration system, according to an embodiment of the present invention, in which system 10 comprises a mechanical support means such as chair 11, on which the patient 12 sits, where chair 11 comprises a backrest 13 and fixation means such as two fixation arms 14 for holding the patient's head in place during harvest and transplantation operations. System 10 further comprises two displacement means such as robotic arms 15a and 15b, onto each of which an automated harvest and transplantation means (illustrated in FIGS. 2 and 10) is movably connected for being displaced to desirable harvest or transplantation locations over a patient head to automatically perform follicle harvesting, displacement and transplantation (described in details in the following figures).

System 10 is controlled by a control module 10a (not shown), which comprises suitable hardware (e.g., processor, memory) and operational software for managing and operating system 10. Control module 10a is configured to operate image acquisition means for performing a scan of a patient's scalp (illustrated in FIG. 2), process the acquired image data and map the scalp condition (e.g., determine thin haired/bald areas for transplantation, and areas with dense hair from which hairs can be harvested), identify and store information related to identified hair follicles and particularly, qualifying candidate hairs for transplantation, generate an optimized harvest/displacement/and transplantation plan while considering aesthetic, efficiency and safety optimization parameters, and finally to operate arms 15a and 15b to execute the hair harvest, displacement and transplantation, according to optimized plan and predetermined operational rules. Control module 10a further comprise required communication means for communicating with remote stations (e.g., a clinic server which may collect general and clinical patient's information, a manufacturer server from which operational software updates are distributed to different units of system 10, a main server which collects mass clinical data for learning purpose, etc.). System 10 further comprises a Human-Machine-Interface 10b (herein referred to as "HMI") being used for monitoring, operating and managing system 10 (e.g., pre-operation configuration of system 10, supervising automated/semi-automated harvest/transplantation process by medical personnel, manually intervening in an automated/semi-automated process where needed, maintaining or managing the configuration of system 10 etc.). HMI 10b may also be a dependent/independent computing device having a touch display, or equipped with suitable input devices (e.g., a keyboard, a mouse, etc.), to be utilized as an operator's interface with system 10, through which an operator can modify default parameters or add new ones (e.g., updating a formula for calculating desirable hair distribution, hair characterizing parameters, etc.).

According to some embodiments of the present invention, control module 10a is configured to communicate with at least one computing device (e.g., a clinic server which may collect general and clinical patient's information, a manufacturer server from which operational software and preset formulas/parameters updates are distributed to different units of system 10, and/or operational commands from a computing device through an internet connection, or through a local wired or wireless connection). According to some other embodiments of the present invention, the added connectivity to computing devices of higher processing capabilities enables the handling of mass data collected from multiple units of system 10, being processed by machine learning modules for providing enhanced operation. For example, learning preferable lighting conditions (e.g., ambient light intensity and wave length ranges, or light produced by suitable means integrated with system 10) for enhancing the image acquisition and optical analysis capabilities of system 10. For example, machine learning can be utilized to learn which parameters may best characterize follicles that has high chances for survivability, fitting, esthetic, etc.

Figure 2:
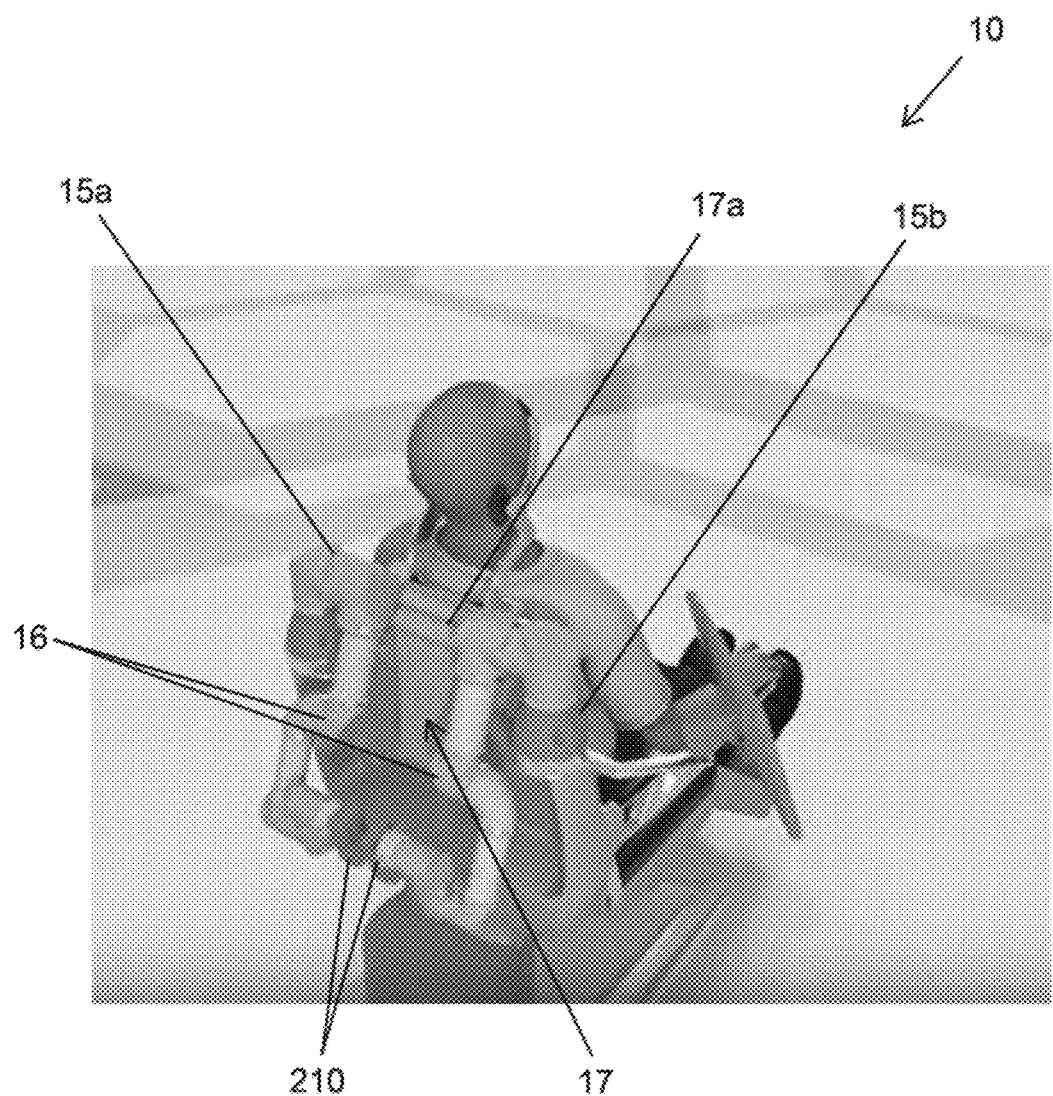
FIG. 2 shows a rear view of the system of FIG. 1.

FIG. 2 shows a rear view of system 10. It can be seen that each robotic arm 15a, 15b ends with a harvesting/transplantation head 210, which includes a harvesting needle, a transplant needle and a rotating storage carousel with a plurality of capsules for storing the harvested follicles until their transplant (will be discussed later on). The two robotic arms 15a and 15b comprise a plurality of joints 15c providing sufficient degrees of freedom for displacing heads 210 to reach any desirable point of a patient's scalp at a desirable approaching angle. FIG. 2 further shows an image acquisition means, such as a scanner 17, comprising a scanning camera 17a, being folded between two robotic arms 15a and 15b. The two robotic arms 15a and 15b and scanner 17 are stored at a folded position when not in active use, thus do not consume space/interfere during idle times.

Scanning camera 17a is configured to scan the entire patient's head for locating optimal donor areas and donated areas, and by utilizing image processing and optimization algorithms being executed by suitable software modules, the patient's scalp is being scanned by camera 17a, and the scanned images are analyzed to determine bald/thin hair transplantation areas, and qualifying follicles at qualifying donor areas, which are considered as candidates for transplant.

Figure 3:
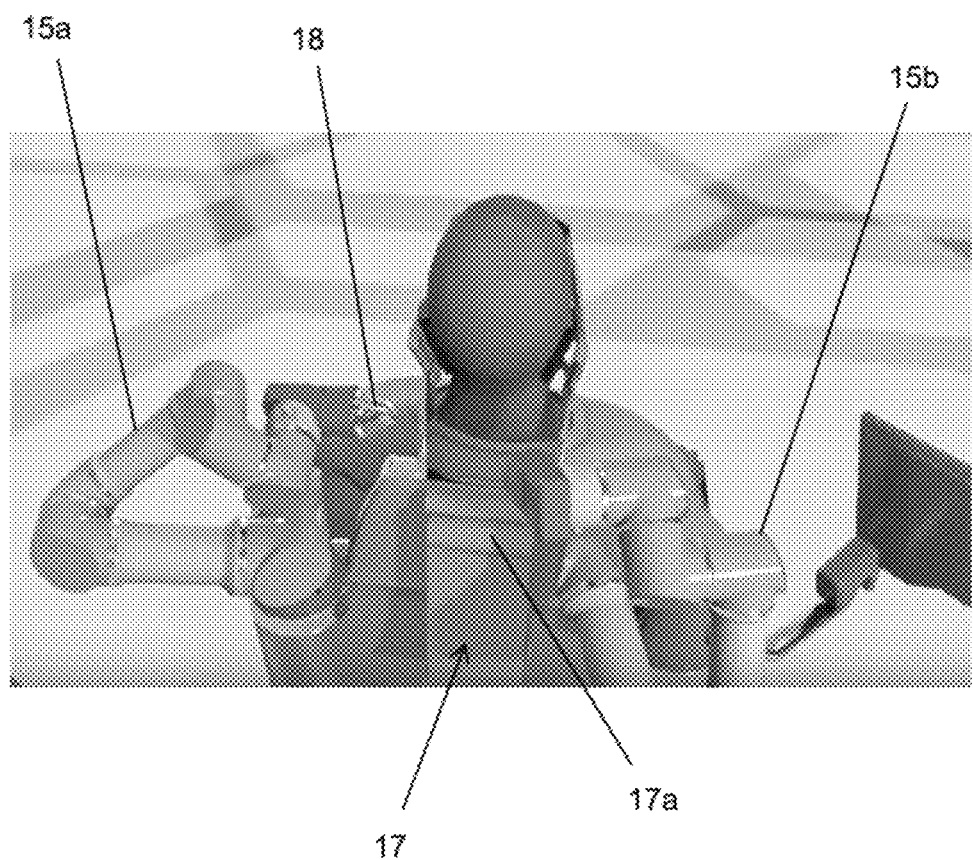
FIG. 3 shows a rear view of the proposed system with two robotic arms in action, according to an embodiment of the present invention.

FIG. 3 shows a rear view of system 10 two robotic arms 15a and 15b in action, according to an embodiment of the present invention, in which each robotic arm ends with a carousel of storage capsules 18, for storing harvested uprooted follicles and two needles, one for uprooting and the other one for transplantation.

Figure 4A:
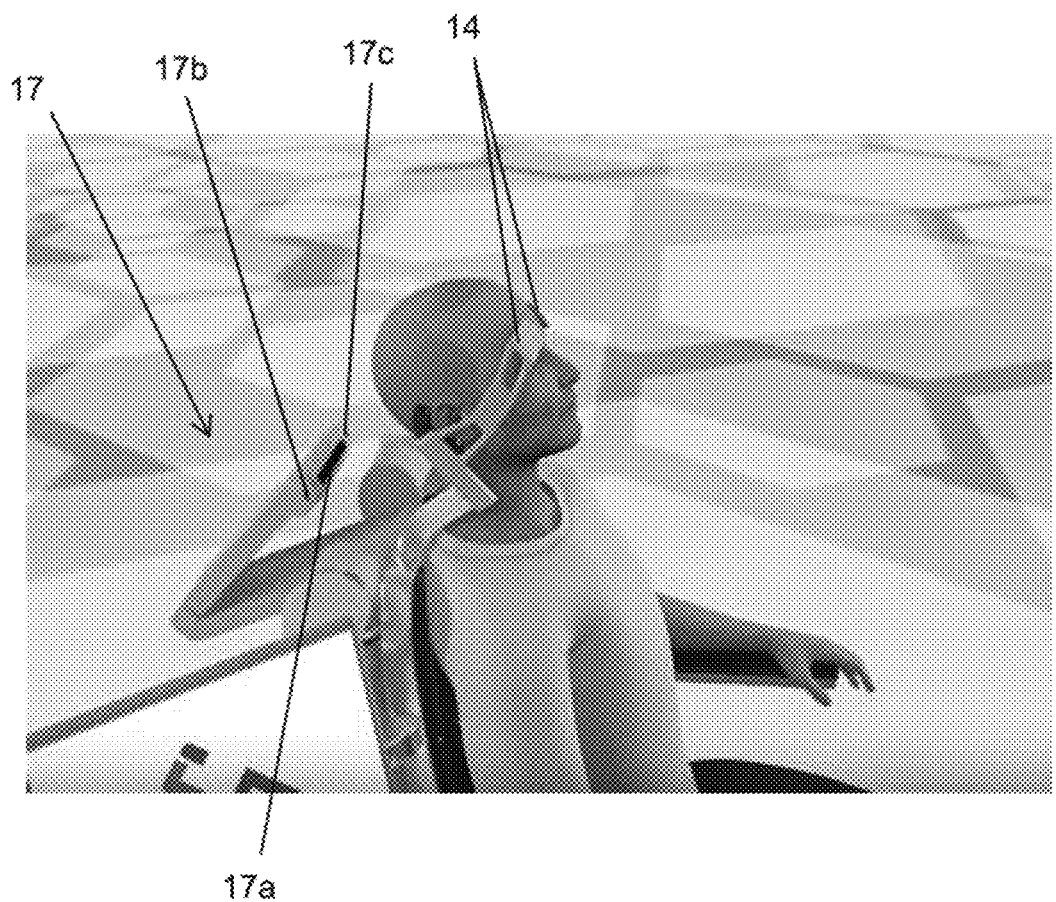
FIGS. 4A and 4B show a perspective view of an automated hair restoration system during scanning operation, according to an embodiment of the present invention.

FIG. 4A shows a perspective view of an automated hair restoration system during scanning operation, according to an embodiment of the present invention, in which folding scanner 17 being deployed towards the patient's 12 head. Scanning camera 17a, located at the edge of scanner 17 comprises lens with an appropriate field of view, therefore is capable of acquiring the entire scalp surface by moving the scanning camera 17a along a desired trajectory over the scalp surface. Scanner 17 consists of a folding arm that is controlled to move scanning camera 17a along that trajectory. Scanner 17 further comprises two additional local cameras 17b and 17c which are located at both sides of the scanner's body and used to focus on each candidate follicle and calculate its orientation with respect to the local scalp surface. Cameras 17b and 17c are uniformly oriented installed towards the patient's head, hence while each of which positioned in an individual coordinates system, acquire planar images thereof shares the same plane, while 60% of fields of view thereof overlap.

Figure 4B:
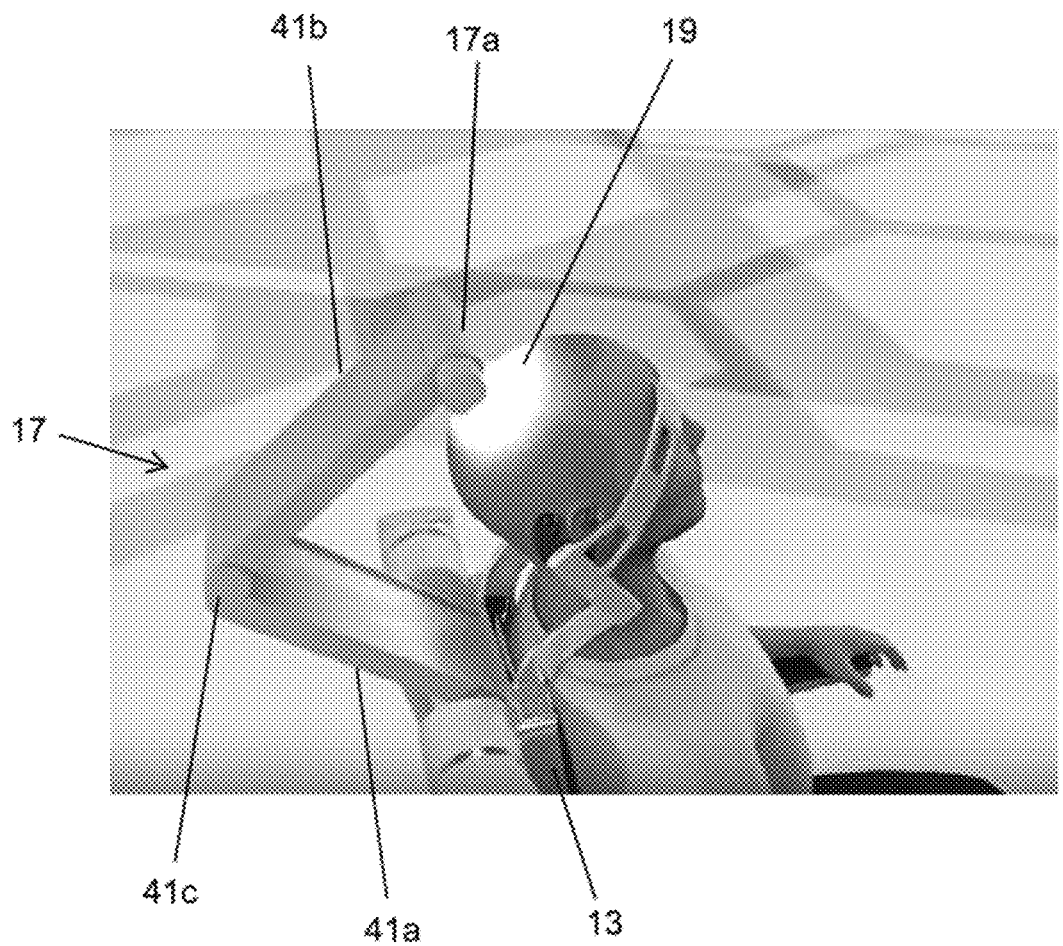

FIG. 4B shows scanning of the baldness area 19 on the patient's 12 head, using foldable scanner 17. It can be seen that folding scanner 17 has a flexible arm with two members 41a and 41b, connected to each other by a joint 42. Control module 10a simultaneously controls the angle between members 41a and 41b and the angle between member 41a and backrest 13 to move scanning camera 17a, as well as cameras 17b and 17c along a desired trajectory.

Figure 4C:
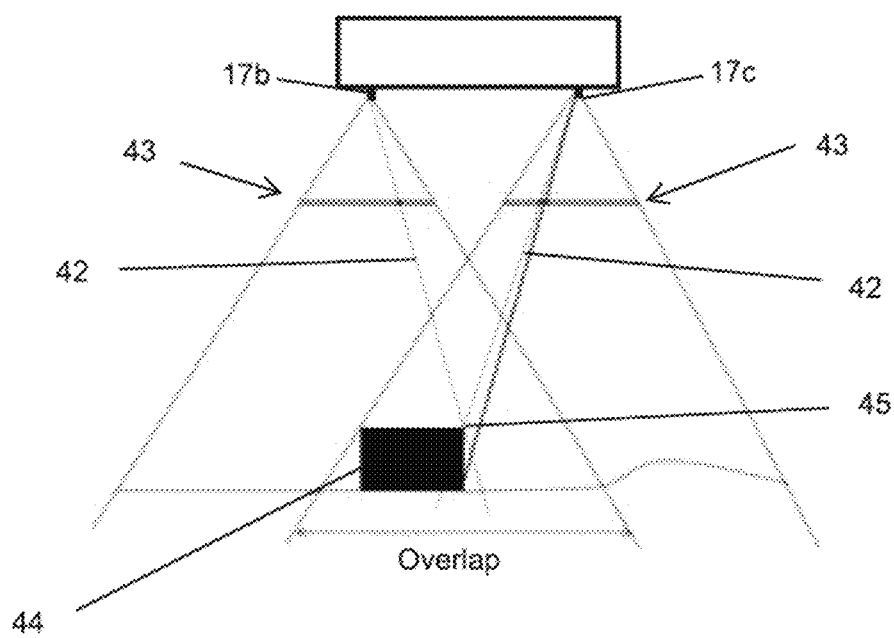
FIG. 4C schematically illustrates an integrated photogrammetric processing of images acquired by a formation of two local cameras, according to an embodiment of the present invention.

FIG. 4C schematically illustrates an integrated photogrammetric processing of images acquired by a formation of two image acquisition means such as local cameras 17b and 17c, according to an embodiment of the present invention, in which the integrated photogrammetric processing of images acquired by cameras 17b and 17c (e.g., CCD cameras) is performed by image processing algorithms executed by control module 10a for generating spatial positioning information required for the mapping of a patient's scalp and hair deployment, as well as for characterizing individual hair follicles initially and ongoing along the harvest/transplantation process as will be further detailed in the following figures. For example, one characteristic of a candidate follicle is the initial hair orientation with respect to the scalp surface—which implies on the follicle inclination within the scalp (i.e., and assist with determining the corresponding harvesting approach angle of the harvesting needle as detailed in the following figures).

In order to process various images acquired by different cameras 17a-17c, and in order to guide the moving elements (e.g., arms 15a-15b, heads 210, etc.) towards spatial points of interest, spatial data has to be extracted from the two-dimensional acquired images, therefore based on the physical principal, according to which all the light beams 42 being reflected from a 3D object 44 (or a hair) converges at the perspective center of a camera, and hence given the geometrical intersection of two beams in space the precise spatial positioning of spatial points of interest can be calculated, where the intersection point 45 is the point at which 3D object 44 intersects the two beams 42 that extend from each of the perspective centers of cameras 17b-17c through each of cameras 17a-17c image planes 43, which are practically the same shared plane due to the formation of cameras 17a-17c.

In order to represent each spatial point of interest at patient's scalp in a uniform/global coordinates system of system 10, control module 10a generates two projection planes which are tangent to the patient's scalp—one horizontal plane at a top view of the patient's head and a second vertical plane at a rear view, where the processed spatial positioning information of objects within images acquired by cameras 17b-17c is being represented first in a spatial ellipsoid coordinates system (i.e., corresponding to a compressed ellipsoid, vertex of which are the patient's hears, followed by projection of the 3D coordinates of each point of interest onto the horizontal and vertical projection planes. This process enables extraction of accurate 3D positioning data from 2D acquired images, representing thereof in a global coordinate system (i.e., following projection of the 3D positioning data to the projection planes) and, in turn, converting the projected positioning data to accurate spatial coordinates, e.g., to which the transplantation needed of system 10 is displaced for transplanting a selected follicle at a desirable location.

Since each acquired image in the scanning operation is initially represented in its own local coordinate system a typical conversion is performed to align all the positioning information within a uniform global coordinates system. Initially four points are marked on a patient's scalp (i.e., points that can be continuously identified by camera's 17b-17c along the harvest/transplantation procedure).

According to an embodiment of the invention, in order to optimally categorize and rank each individual hair from the donor area, the system performs a combination of visual and spectral and thermal analysis. During the follicle removal the donor area is usually covered with the patient's blood, visual analysis is no longer possible. Hence, performing thermal analysis allows continuing follicle removal, since thermal imaging is less sensitive to the presence of blood. Spectral analysis allows to assess the hair's chemical composition that can give indication on hair's health, age etc.

Basically, visual analysis is used to inspect and rank each individual hair that grows from each follicle. By combining visual analysis and thermal and spectral imaging and analysis, the ranking accuracy of each candidate hair is improved, since thermal and spectral imaging may provide additional data regarding the quality of the follicle of the inspected hair.

The combination of visual and spectral and thermal analysis allows assigning a corresponding weight to each type of analysis and performing data fusion of all the collected data types. The data fusion allows more accurate characterization of each pair of follicle and growing hair, which leads to greatly improved ranking.

Ranking is performed using software that builds a ranking function, based on the data fusion. The ranking function allows selecting the optimal hair for the donor area for each individual transplant. Each variable in the ranking function is provided with a weight with default value, which is configurable. This allows for optimizing the ranking function based on the level of experience of the operator.

Hair Characterization Through Optical Analysis

After scanning each patient's head, control module 10a process the 2-dimensional (2D) scanned images utilizing image processing algorithms to create a planar map of a patient's head with different hair density areas and to identify and characterize candidate follicles for transplantation. The acquired images, processing temporary (e.g., during processing) and final (e.g., processing results) data, mapping and follicles data are stored in suitable data storage means (i.e., which can be either integrated or in communication with control module 10a.

Figure 5A:
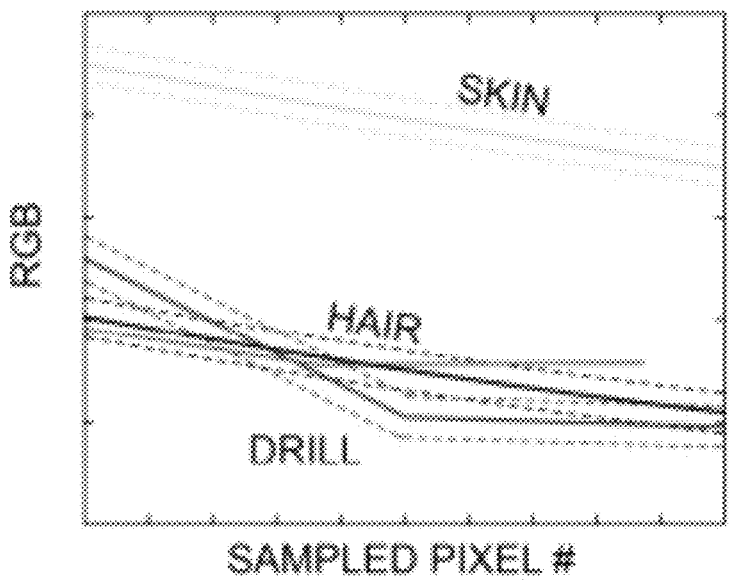
FIG. 5A shows an exemplary chart of learnt spectral signature of skin (pink), hair (black), and transplant drill (red), according to an embodiment of the present invention.

Initially, all the acquired images by scanner 17 are processed (i.e., by corresponding algorithms) through empirical line radiometric calibration enabling segmentation, classification and identification of distinguished objects, followed by implementing technics such as contrast comparison for each pixel (i.e., of an acquired scalp image) with respect to a residing pixel and maximum likelihood estimation for classifying pixels to predefined categorized groups A preliminary learning step is performed for each specific patient including scanning a scalp area and sampling pixels related to the captured elements (i.e., scalp skin, hair, skin lesions, transplantation drills) and statistically calculating the Red, Green, Blue (RGB) spectral signature (e.g., average vector, covariance matrix) of each element. FIG. 5A shows an exemplary chart of learnt spectral signature of categorized groups as skin (pink), hair (black), and transplant drill (red), extracted by control module 10 based on average and standard deviation calculations of reflected RGB light.

The learnt spectral signatures are used for classifying pixels of scanned images during the transplantation process (i.e., by scanner 17) as being of one of the categorized groups (e.g., skin, hair or transplant drill), by applying a maximum likelihood estimation (MLE) algorithm, for calculating the likelihood of an assessed pixel to belong to one of the learnt groups, based on the RGB signature of an assessed pixel, and the average RGB signature of each learnt categorized group, as calculated by equation 1:

$$L(k) = \tfrac{1}{2}\ln(|\Sigma_k|) - \tfrac{1}{2}(x-\mu_k)^T \Sigma_k^{-1}(x-\mu_k) \qquad [1]$$

Where—
L—Is the presence value of the assessed pixel's RGB signature in each learnt group (k) (e.g., k=1 for hairs, k=2 for skin and k=3 for drills);
$\Sigma_K$—Is the covariance matrix of all observations that belong to a specific group (category) [to the inventor: please clarify if required];
X—Is the assessed pixel's RGB signature; and
$\mu_k$—Is the average RGB signature of group k.

The calculation is performed once for each group k, where the assessed pixel is being classified to the group for which the calculated likelihood L is the highest.

Figure 5C:
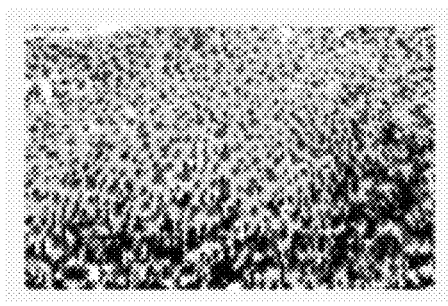
FIGS. 5B-5C show scalp images along the transplantation and pixel classification process, according to an embodiment of the present invention.
Figure 5B:
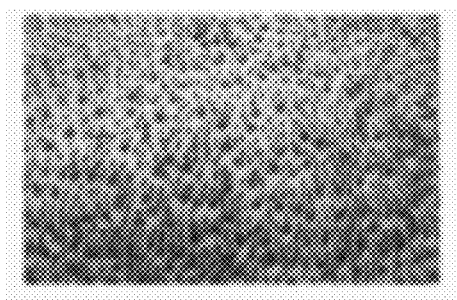

FIGS. 5B-5C show scalp images along the transplantation and pixel classification process, including an acquired image after the transplantation process (FIG. 5B) showing scalp skin, hairs and transplant drills, a colored classifications image resulting MLE processing (FIG. 5C) in which hair elements are represented by black pixels, skin elements are represented by pink, drill elements are represented by red pixels and pixels having low calculated likelihood for all three groups are represented by white pixels.

Figure 5D:
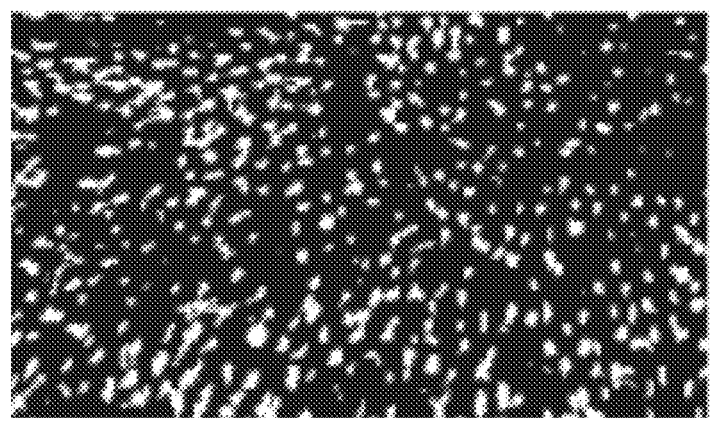
FIG. 5D shows an exemplary binary classification conversion of the MLE (Maximum Likelihood Estimation) of FIG. 5C, according to an embodiment of the present invention.

FIG. 5D shows an exemplary binary classification conversion of the categorical classified image (FIG. 5C), according to an embodiment of the present invention, in which hairs are represented in white and elements of the other groups are represented in black. The binary classification shown in FIG. 5D is processed through a region growth algorithm which assesses white pixels with respect to the residing pixels, identifying a specified link-level of residing pixels, where for example, two residing pixels in any of the 4 directions—above, below, right-hand, left-hand—being of the same color are level 4 linked.

Figure 5E:
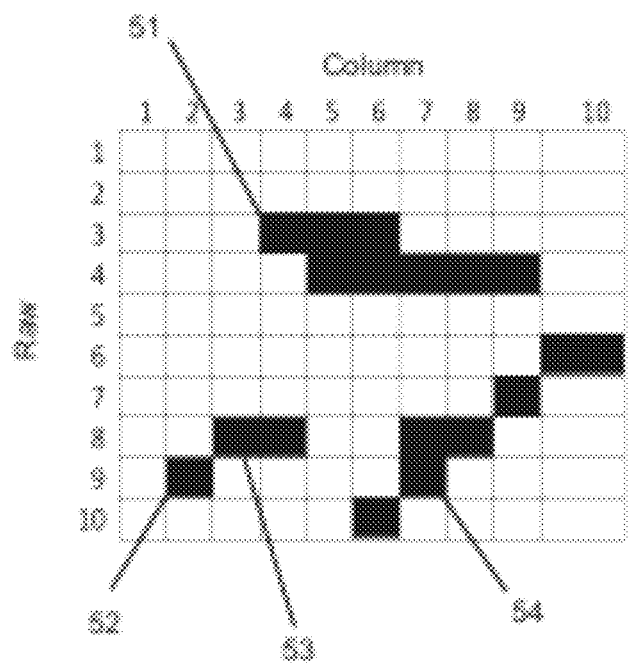
FIG. 5E shows an enlarged and inverted section of FIG. 5D.

FIG. 5E shows an enlarged and inverted section of the binary classification of FIG. 5D, showing 4 extracted hair objects, where the pixels of object 51 are all linked at level 4, two separate objects 52 and 53 are level 8 linked (i.e., the pixel of object 53 is linked to one of the 8 surrounding pixels which belongs to object 52). Object 54 is identified as a single object being inclined with respect to the rows and columns of the assessed section. In this case, various geometrical parameters (e.g., used for characterizing hair size, thickness, angle with respect to the scalp surface) are calculated with low accuracy level.

In order to improve the accuracy level, a Principal Component Analysis (PCA) spatial conversion is performed (i.e., a suitable image processing algorithm is executed by control module 10a) for calculating the principal and orthogonal directions of hair objects, regardless of the arbitrary axes (i.e., axes of the acquired image). The PCA conversion is calculated by equation 2:

$$PCA = u_i \cdot (x_i - \hat{\mu}) \quad [2]$$

Where—

$u_i$—Is the independent self-values vector (resulting from the covariance matrix);

$x_i - \hat{\mu}$—Is the subtraction of the average value from the empiric value in each axis.

Figure 5F:
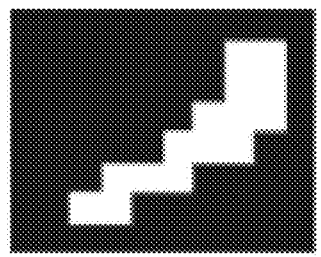
FIGS. 5F-5G schematically illustrate exemplary PCA (Principal Component Analysis) analysis operation over a hair object, according to an embodiment of the present invention.
Figure 5G:
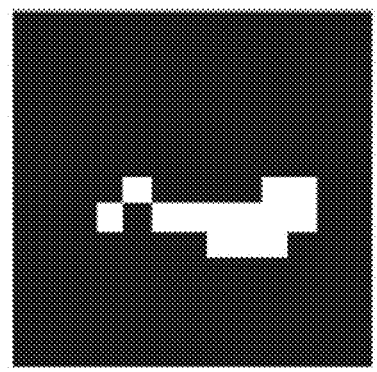

FIGS. 5F-5G schematically illustrate exemplary PCA analysis operation over a hair object, according to an embodiment of the present invention, in which the analyzed hair is deployed at an angle of 51.17° with respect to the principal axes (FIG. 5F). The primary direction is x axis of FIG. 5G and the orthogonal y axis of FIG. 5G is the secondary direction. It can be seen in FIG. 5G that the channeled variance was reduced after applying the PCA conversion.

Whereas the principal directions are calculated, desirable hair characteristics can be calculated:

Hair length—calculated as the distance between the extreme pixels of hair object along the x axis, multiplied by the image scale;

Hair thickness—calculated as the average pixel values along the y axis, multiplied by the image scale;

Hair angle with respect to the scalp—calculated in the PCA conversion as the co-variance matrix in the primary axes, for each hair by equation 3:

$$angle = acos(u_{1,2}) \quad [3]$$

Where $u_{1,2}$—is the first value in the second of two self-vectors.

The PCA conversion resulted with two self-vectors and the angle is calculated by a scalar multiplication of the two vectors in the axes system of the image and in the normalized self-values vector.

Figure 11A:
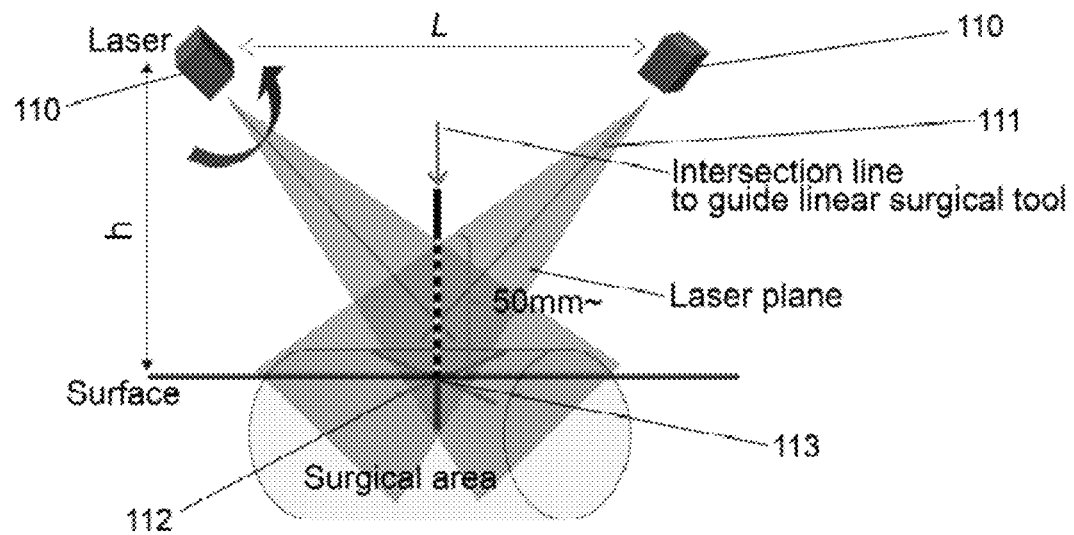
FIGS. 11A-11B show exemplary visual monitoring and guiding means, according to an embodiment of the present invention.
Figure 11B:
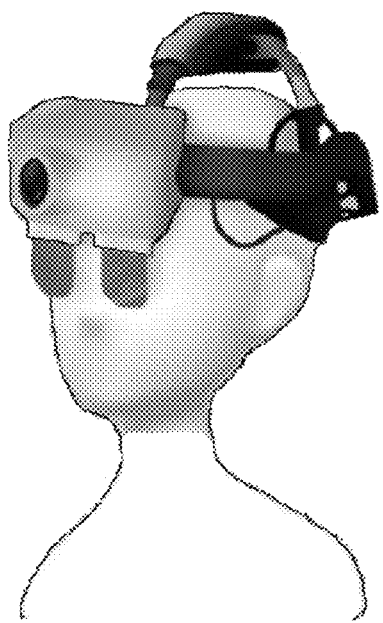

Hair's distance from a linear element (e.g., a scratch, a significant blood vessel), calculated by equation 4:

$$d = \frac{a \cdot x_0 - y_{0+b}}{\sqrt{a^2 + 1}} \quad [4]$$

as the distance d between a point (x0, y0) and a linear formula (y=ax+b) representing a vessel, that can be detected by suitable image acquiring means (e.g., infrared cameras, multi-spectral 3D imaging means, and similar means well known in the art), where such means can be used in conjunction with supervision and guiding means such as the augmented reality headset of FIG. 11B.

Hair's darkness level, which is significant for ensuring aesthetic transplantation results, where a hair's darkness level is calculated by the spectral value of each pixel representing an hair, as the largest spectral distance from the hair's center downwardly (i.e., towards the darkest shade of the spectral signature).

Eventually, the statistical spectral distance is calculated by equation 5:

$$(x-\mu_k)^T \Sigma_k^{-1} (x-\mu_k) \quad [5]$$

Where—

$\Sigma_K$—Is the covariance matrix of each learnt group;

X—Is the assessed pixel's RGB signature; and $\mu_k$—Is the average RGB signature of group k.

Other hair spectral characteristic can be used for identifying the hair structure which can reflect on the hair's age, strength, as well as multiple hairs extending from a single follicle, which also reflects on hair's strength.

Furthermore, as sensing technologies are constantly developing, future characterizing information being acquired and stored directly (e.g., using electric field/current and resistance/conductivity measuring to detect blood vessels under the skin near to an assessed hair follicle or the amount of the tissue surrounding the hair bulb), or calculated by collecting acquired information from individual/combination of sensors, will also be processed by suitable algorithms which can be easily integrated and applied by control module 10.

The calculated hair characteristics can be used for decision making before and during (i.e., in real-time) the harvest/transplantation process in aspects such as desirable hair shade uniformity, hair strength, hair growth direction, etc.

One significant use of the calculated hair characteristics is Pre-Harvesting Hair Ranking of each characterized hair. The ranking score of the hair (HS) helps to rank hair candidates for harvesting, and is calculated by equation 6:

$$HS(h) = \Sigma_i HP_i(h) * w_i \quad [6]$$

Where HP (Hair Property)—Is a normalized value for each of the abovementioned characteristic (e.g., length, darkness level, etc.) for a given hair; and w—is a relative weight given for each property.

Another important characteristic considered as a weighted property in HS of each hair, is a distribution ranking which is determined by the location of a given hair within dense/thin hair area.

Control module 10a calculates this ranking based on the Scan done by scanner 17, and stores it to a database (i.e., suitable database software ran by control module 10a and utilizing the memory means thereof). This information is used to guide system 10 harvesting plan, or to guide a medical personnel, when performing manual harvesting when required.

Furthermore, the score of the hair (HS) gets updated after harvesting based on the abovementioned characteristics and based on additional characteristics which can be acquired/processed only after hair follicles are harvested, for example, the follicle bulb and amount of tissue on the harvested hair, which may imply more healthy hair to endure transplantation. Particularly, a Hair or FU that was rendered damaged will be completely ousted from the implantation. However, there can be partial damage that is described as an additional HP value and factor into HS calculation. On an on-going basis, control module 10a updates the scoring of harvested hair follicles in the corresponding database.

According to some embodiments, control module 10a attaches a categorizing labels for each hair. For example, the scoring values (i.e. HS) are divided into 3 ranges, A, B, and C, so that A is at the top range, and C is at the bottom. Given this classification, the transplantation plan is updated to include the minimum number of top ranked candidate follicles.

The abovementioned optical analysis of acquired patient's scalp images provides significant information which is used to map the current patient's scalp (i.e., current hair deployment and candidate follicles for transplantation), and in turn to generate an optimized harvesting and transplantation plan, where the plan can be continuously reviewed and amended until achieving a desirable deployment of hair follicles across the patient's scalp, while displacing the minimum required number of qualifying follicles, as well as deciding which scalp areas should be avoided, thereby significantly reducing the process time and minimizing the thinning of dense haired scalp areas.

Furthermore, the abovementioned optical analysis enables harvesting of inclined follicles at the appropriate approach angle, thus increasing the number of qualifying candidate follicles for harvest which could not be considered without the abovementioned processing techniques for calculating the hair's angle. Moreover, the abovementioned optical analysis enables considering candidate curled hairs, thereby enabling hair restoration for a wider range of patients.

Figure 6A:
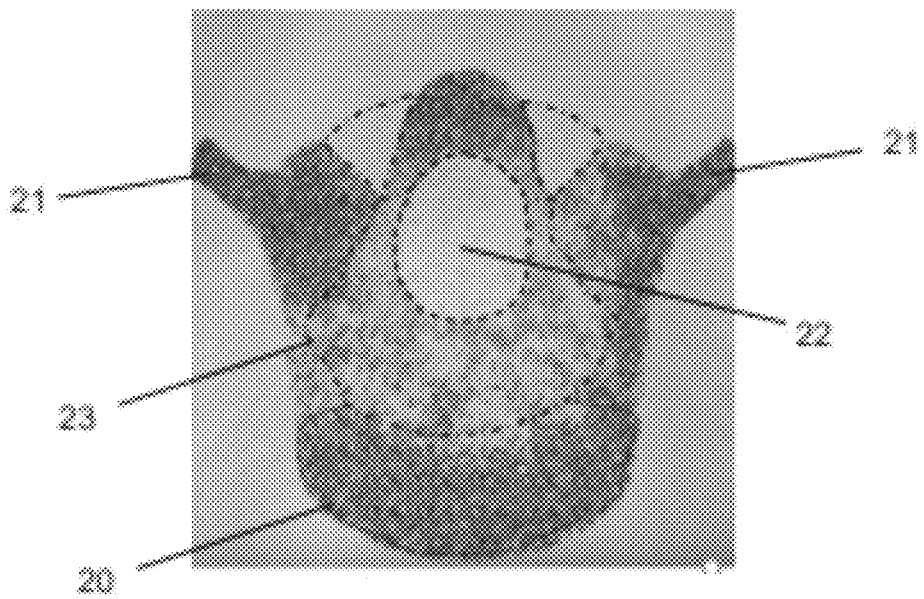
FIG. 6A shows an exemplary planar map of a patient's head illustrating a transplantation plan generated by control module 10a, according to an embodiment of the present invention.

FIG. 6A shows an exemplary planar map of a patient's head illustrating a transplantation plan generated by control module 10a, according to an embodiment of the present invention, in which identified scalp areas of different hair density are shown with borderlines marked by the medical personnel, where a potential donor area 20 is a dense haired area on the lower rear patient's scalp, sideburns area 21 is also a potential donor area, and full bald area 22 and thin haired area 23 are identified as target areas for transplantation. The purple dots shown in area 20 are identified candidate follicles for displacement from the donor area to the target areas, and the green dots in the target areas 22 and 23 are transplantation target points. Each purple follicle is to be harvested, displaced and transplanted at a designated location marked by a green spot. Of course, while the green and purple markings are shown as an exemplary deployment plan, each identified candidate follicle and each transplantation target point are recorded by control module 10a with a unique identification (e.g., a number, a combination of numbers and letters, etc.) for designating each candidate follicle to its target transplantation point. Control module 10a optimizes the harvesting locations for each candidate follicle, considering aesthetic aspects such as uniform hair distribution within the marked borderlines and uniform areal hair shade distribution, as well as efficiency aspects such as shortest displacement paths.

Figure 6B:
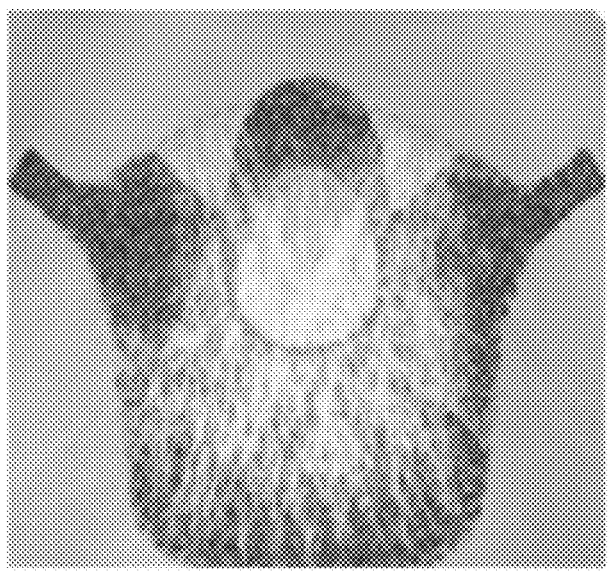
FIG. 6B shows an exemplary planar map of a patient's head illustrating transplantation with displacement path plans generated by control module 10a, according to an embodiment of the present invention.

FIG. 6B shows an exemplary planar map of a patient's head illustrating transplantation with displacement path plans generated by control module 10a, according to an embodiment of the present invention, visually illustrating the displacement path of each candidate follicle to be transplanted (i.e., from its initial growth location to the target transplantation point at the transplantation target area) and the optimal planned transfer paths of each follicle. This plan is generated by control module 10a using optimization algorithms that calculate the minimum possible distance for each follicle in order to shorten the time from the moment of harvesting until the actual transplantation. Shortening the harvest-to-transplantation times also minimizes the harvest effect and reduces the follicle deterioration during that period of time, thus maintaining the harvested follicles at qualifying condition and reducing the need for re-harvesting new follicles in lieu of deteriorated harvested follicles. According to some embodiments of the invention, further algorithms are executed by control module 10a for minimizing displacement path conflicts (i.e., crossing or too near displacement paths) during which one robotic arm awaits for a second robotic arm to pass through.

The accumulated optimization resulting from candidate follicles optimization (i.e., learning hair density areas, identifying individual hairs, characterizing and ranking thereof for selecting the best qualifying follicles), displacement optimization (illustrated in FIG. 6B) and distribution optimization (to be illustrated in the following description) enables the proposed system to perform a successful lean harvest/transplantation procedure which improves the patient's experience.

According to some embodiments of the present invention, control module 10a executes a hair distribution assessment and optimization plan algorithm which calculates the initial hair distribution of the individual patient, identifies areas with lower distribution and being executed iteratively by control module 10a, to plan harvest and transplantation operations required to achieve uniform hair distribution across the patient's scalp.

Figure 7A:
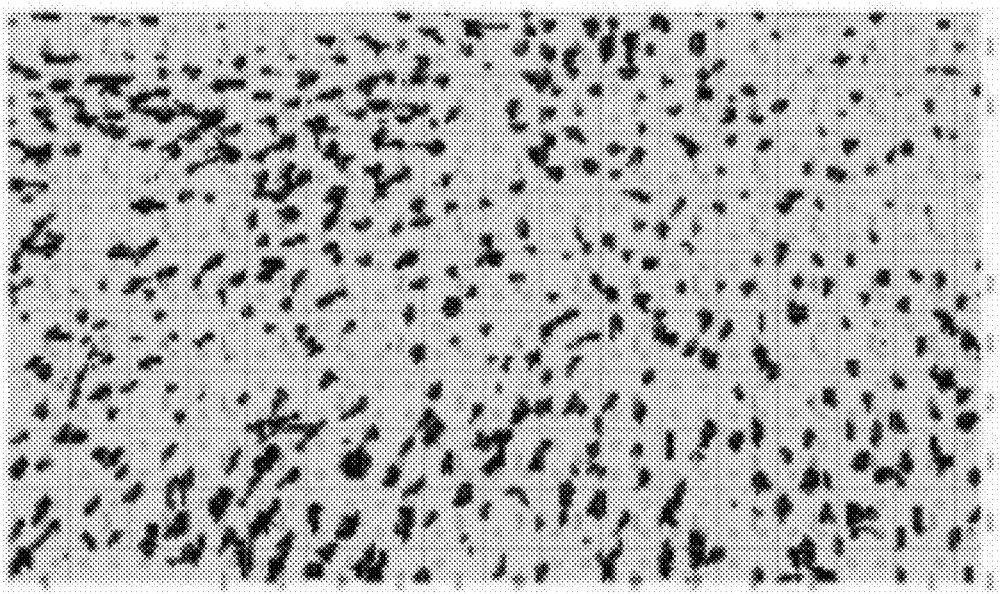
FIGS. 7A-7B illustrate hair distribution assessment and planning process according to an embodiment of the present invention.
Figure 7B:
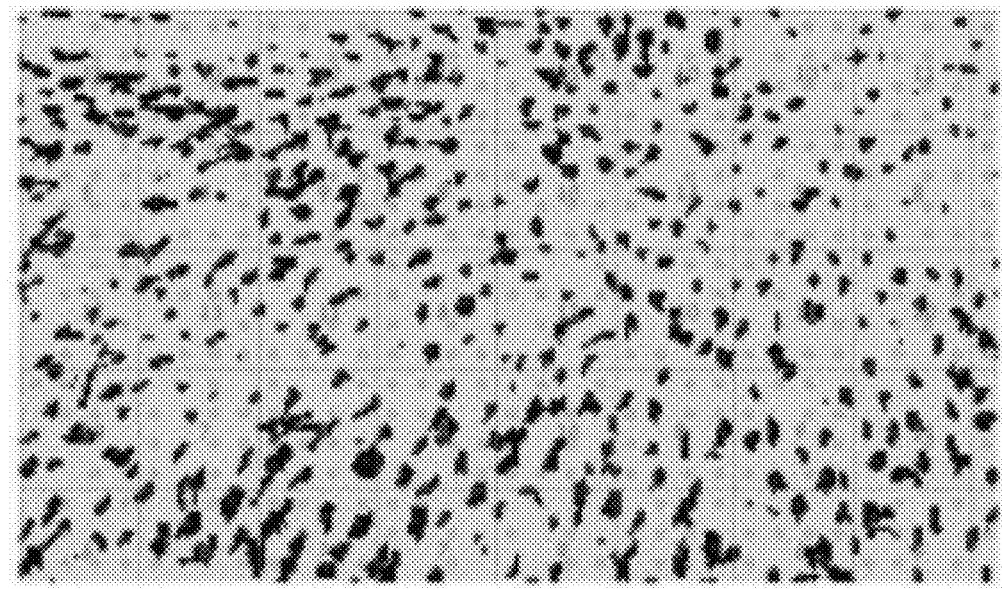

The hair distribution assessment and optimization plan algorithm divides the scanned donor area to a grid of rectangle cells (illustrated in FIG. 7A), identify the number of hairs in each cell, similarly divides the target transplantation area to cells (illustrated in FIG. 7B), assesses the number of hairs in each cell of the target transplantation area, while each cell is numbered for identification, whereas a target cell is detected to comprise lower number of hairs with respect to the average distribution, it becomes a target point for hair transplantation in the optimized transplantation plan.

Figure 8:
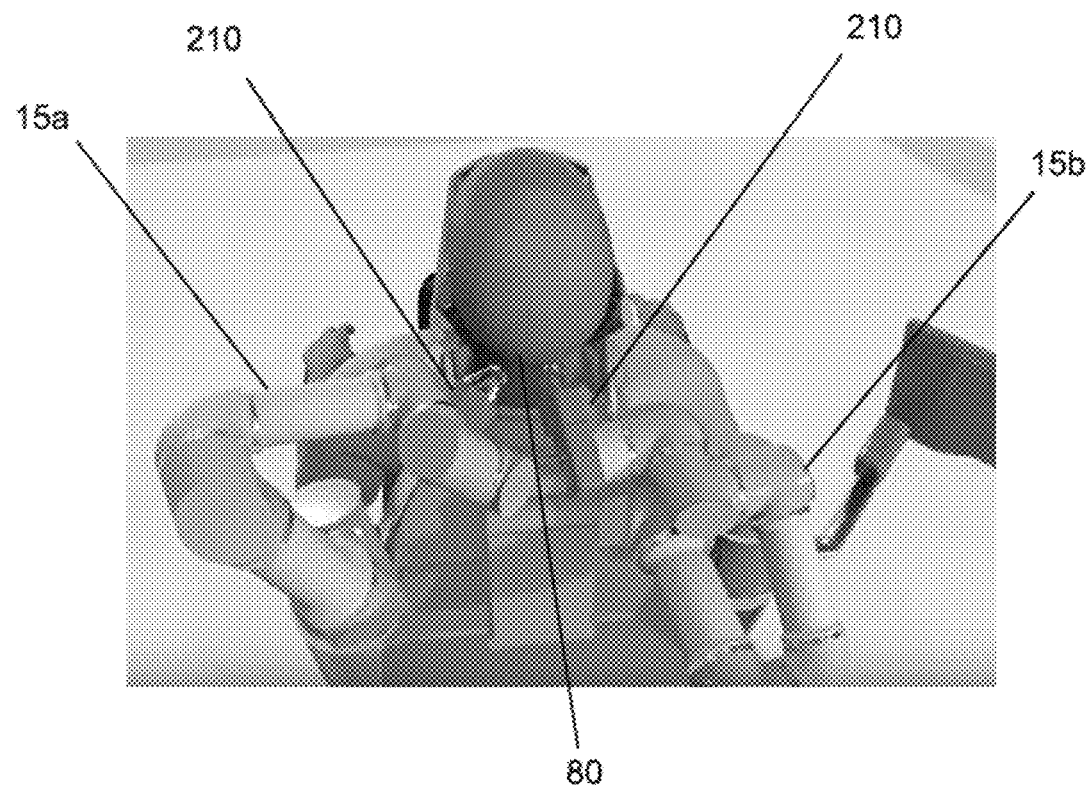
FIG. 8 shows a rear view of the proposed system with robotic arms performing hair harvest operation, according to an embodiment of the present invention.

FIG. 8 shows a rear view of the proposed system with robotic arms performing hair harvest operation, according to an embodiment of the present invention, in which robotic arms 15a and 15b harvest follicles from the donor area 80. It can be seen that both arms 15a and 15b are controlled to work in parallel (to shorten the process), while displacing each corresponding harvesting/transplantation head 210 to be above a corresponding candidate follicle.

Control module 10a also calculates the minimal instantaneous distance between the closest portions of moving and/or stationary components of system 10, and maintains a minimal safety distance which exceeds a predetermined safety distance, so as to prevent potential collision.

Figure 9:
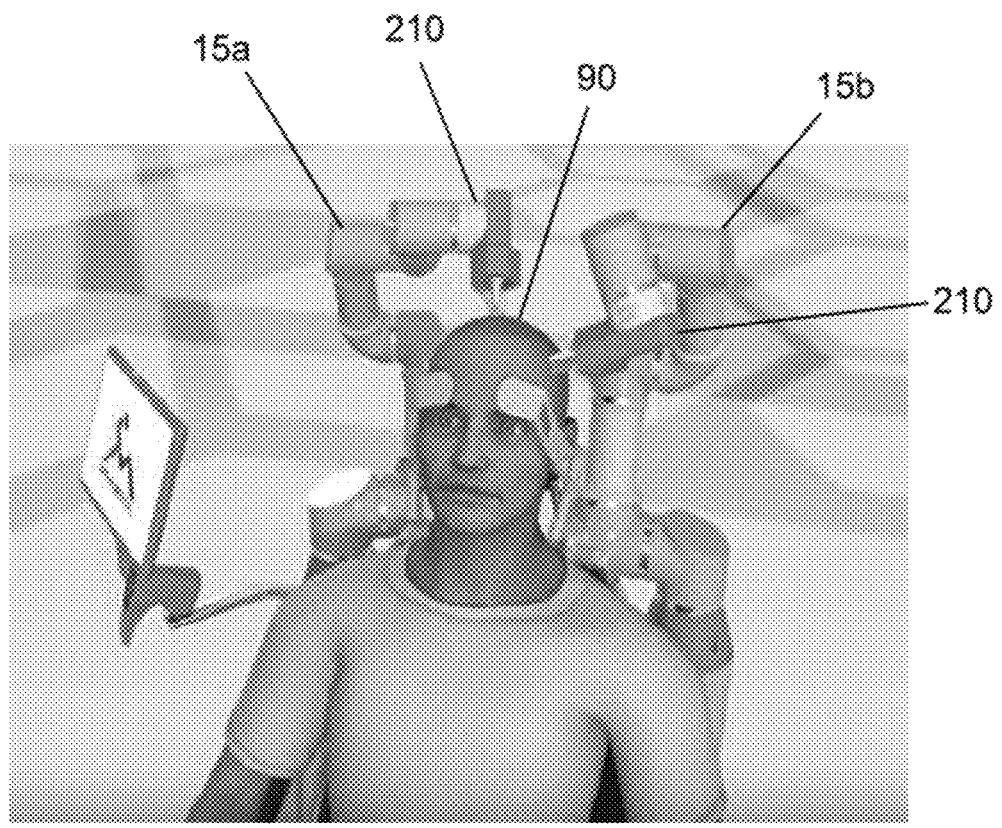
FIG. 9 shows a rear view of the proposed system with robotic arms performing hair transplantation operation, according to an embodiment of the present invention.

FIG. 9 shows a rear view of the proposed system with robotic arms performing hair transplantation operation, according to an embodiment of the present invention, in which robotic arms 15a and 15b during hair transplantation in the donated area 90. Here again, both arms 15a and 15b are controlled to work in parallel (to shorten the process), while bringing each corresponding harvesting/transplantation head 210 to be above a desirable implantation location, according to the transplantation plan. Control module 10a also calculates the instantaneous distance between the closest portions of arms 15a-15b and of heads 210 two harvesting/transplantation heads 210, to ensure that the distance always exceeds a predetermined minimal safety distance so as to prevent potential collision.

Figure 10:
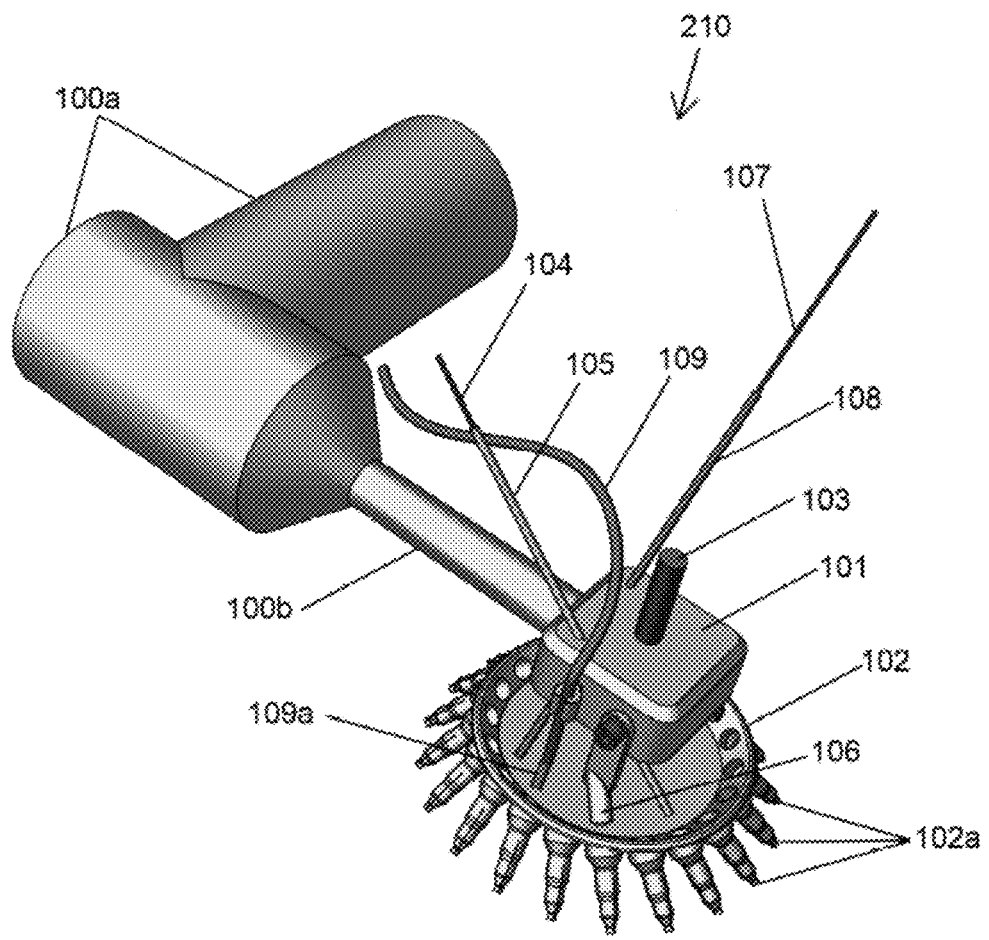
FIG. 10 shows an enlarged view of an optional configuration of harvesting/transplantation head 210, according to an embodiment of the present invention.

FIG. 10 shows an enlarged view of an optional configuration of harvest/transplantation head 210, according to an embodiment of the present invention, in which head 210 comprises two orthogonal arms 100a, a tubular member 100b that ends with an activation box 101, onto which harvest and transplanting needle mechanisms as well as a temporal storage means are movable connected (described in details in the following harvesting and transplanting processes description below), wherein the harvest needle mechanism comprises concentric harvesting needle 104 and sleeve 105, and the transplanting needle mechanism comprises concentric transplanting needle 107 and sleeve 108, and the temporal storage means comprises a rotatable storage carousel 102 with a plurality of capsules 102a for storing the harvested hair follicles until their transplant. Activation box 101 is controlled by control module 10a, according to instructions of the operating software.

Storage carousel 102 is engaged to activation box 101 by a rotation shaft 103 which is controlled to rotate carousel 102 and capsules 102a by predetermined equal steps. Activation box 101 also comprises a harvesting needle 104 which concentrically moves inside a sharpened sleeve 105 that functions as a drill for uprooting follicles, and a follicle camera 106 utilized for monitoring the status of harvested follicles stored at carousel 102 and for identifying target follicles for harvesting and target transplantation points. FIG. 10 further shows a transplanting needle 107 which is capable of concentrically sliding inside a sharpened sleeve 108 that functions as a linear guide for directing harvested follicles to points of insertion in the donated area, where sleeve 108 is rotated by suitable rotation devices (e.g., electric step motors).

Harvesting Process:

During harvesting process, control module 10a rotates carousel 102 (e.g., by corresponding rotating means connected to shaft 103) in steps such that at the end of each step, one capsule 102a exactly coincides with the central axis of harvesting needle 104. At this stage, a camera 106 is directed to a selected follicle in the donor area and the robotic arm 15a (or 15b) is controlled to point harvesting needle 104 to that selected follicle, while being aligned with the local angle between the hair extending from the selected follicle and the patient's scalp (i.e., with the follicle inclination within the scalp). Then control module 10a advances sleeve 105 through the corresponding capsule 102a, such that the sharpened tip of sleeve 105 penetrates the patient's scalp up to a predetermined depth that is sufficient to uproot and harvest the selected follicle. Of course multiple different electro-optical and/or electromechanical position detection means known in the art can be selected for monitoring and indicating the relative position of needle 104 within sleeve 105, and hence the current insertion depth of needle 104 within the patient's scalp. After harvesting, control module 10a retracts sleeve 105 via capsule 102a, which closes and grasps the harvested follicle. This process is repeated for more candidate follicles, until the entire carousel 102 is full of harvested follicles. Then system 10 switches to transplanting stage.

According to an embodiment of the present invention, harvested hairs can be stored at an external storage to system 10, such as a storage vessel comprising storage capsules similar to capsule 102a, where the spatial coordinates of the external capsules are predefined by control module 10a.

Transplanting Process:

During transplanting process, control module 10a rotates carousel 102 in steps such that at the end of each step, one capsule 102a exactly coincides with the central axis of transplanting needle 107. At this stage, a camera 106 is directed to a selected point in the donated area and the robotic arm 15a (or 15b) is controlled to point transplanting needle 107 to that selected point, while being aligned with the local angle between existing hair and the patient's scalp. Then control module 10a advances sleeve 108 through the corresponding capsule 102a, such that the sharpened tip of sleeve 108 penetrates the patient's scalp up to a predetermined depth to create a bore that is sufficient for implanting (i.e., the penetration depth can be controlled by suitable position detection means that can continuously monitor and indicate the position of sleeve 108 with respect to its retracted position and to the desirable penetration depth). Then transplanting needle 107 is advanced to push the harvested follicle out from capsule 102a and insert it into the bore made by sleeve 108. After implanting, the control module 10a retracts transplanting needle 107 and sleeve 108 via capsule 102a. This process is repeated for all remaining capsules 102a, until the entire carousel 101 is emptied from harvested follicles.

Harvest and transplantation head 210 may also comprise capsule cleaning means such as an air pipe 109 ending with an air blowing nozzle 109a, for applying a burst of air pressure thereby cleaning each capsule 102a after use, where blowing nozzle 109a can be positioned right next (e.g., one rotation step of carousel 102) to the tip of transplanting needle 107, thus as soon as a capsule 102a is aligned with needle 107 for beginning a transplant, the capsule 102a of the previously transplanted follicle, is being aligned with blowing nozzle 109a for getting cleaned.

According to some embodiments of the inventions, visual monitoring and guiding means are utilized for supervising and assisting automated harvest/transplantation operations of the proposed system and for guiding manual operations where manual intervention is required.

Exemplary assistive monitoring and guiding means are shown in FIGS. 11A-11B, wherein FIG. 11A shows paired laser devices 110 projecting corresponding guiding beams 111, of which intersection at certain relative angles results with linear projections on a target surface (i.e., scalp) forming a cross marking 112 on a target spot 113, where by changing the angle and direction of the beams oscillation the cross marking 112 (i.e., or another marking form which can be drawn by other configurations of laser devices) can be projected onto a desirable point of interest (e.g., planned transplant location) toward which head 210 will aim its transplanting needle 107, or supervising medical personnel can direct a manual transplantation device, or manually operate head 210 (e.g., through HMI 10b) where manual intervention is required. According to some embodiments of the invention, the abovementioned laser devices 110 are embedded within system 10 (e.g., installed with chair 11, with arms 15a and 15b, with heads 210 etc.), while according to other embodiments laser devices 110 are independently positioned (i.e., not embedded with system 10), where suitable calibration step can be performed when initializing system 10 and/or at desirable operational stages for achieving unified coordinates system for all the corresponding components of system 10. One skilled in the art will readily recognize alternative marking means that can be utilized in lieu or in conjunction with laser devices 110 for providing similar guiding indications.

Of course, HMI 10b can also be used in conjunction with camera 106, scanning camera 17a or other imaging means for displaying the scalp areas of interest to the supervising medical personnel.

Moreover, according to some embodiments of the invention, augmented reality headset (shown in FIG. 11B) is employed for providing an enhanced visual supervision of the medical personnel on the automated operation of system 10, as well as enhanced guidance during manual operations (e.g., a unique situation where the access to hair is partially blocked by patient's ear or a lesion) during which the various displayed layers can direct the medical personnel to the target follicle to be harvested, and in turn to the target transplantation coordinates.

Although the proposed system is illustrated in the figures as a two-arm system that works in parallel with both the hair removal and the hair transplant, the same process can be done with just one arm, but roughly doubling the procedure length in time, where system 10 can also be configured with a larger number of robotic arms, each of which carries one or more heads 210 for adapting system 10 to a faster operation.

Figure 12A:
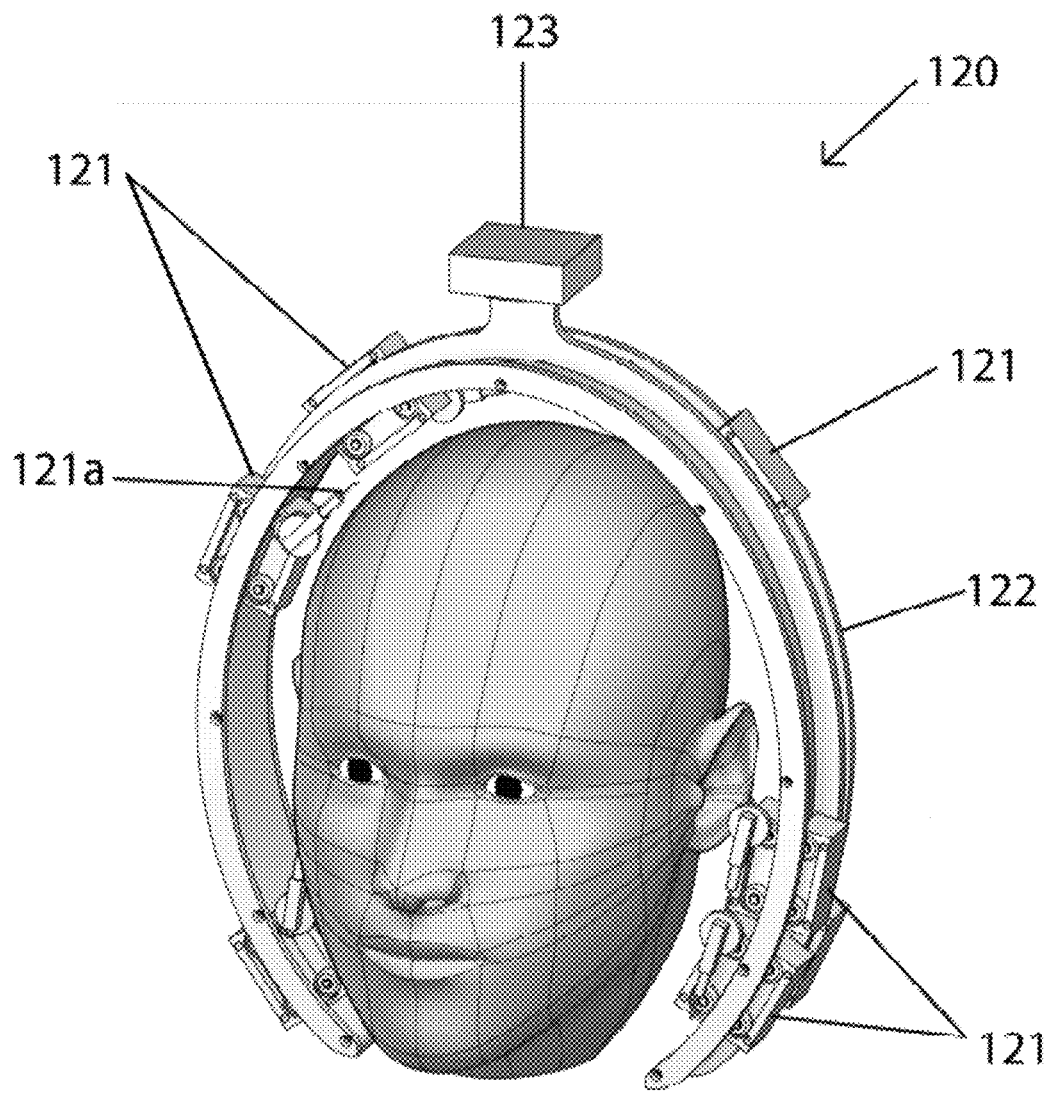
FIGS. 12A-12C show an alternative configuration of an automated hair restoration system, according to an embodiment of the present invention.
Figure 12B:
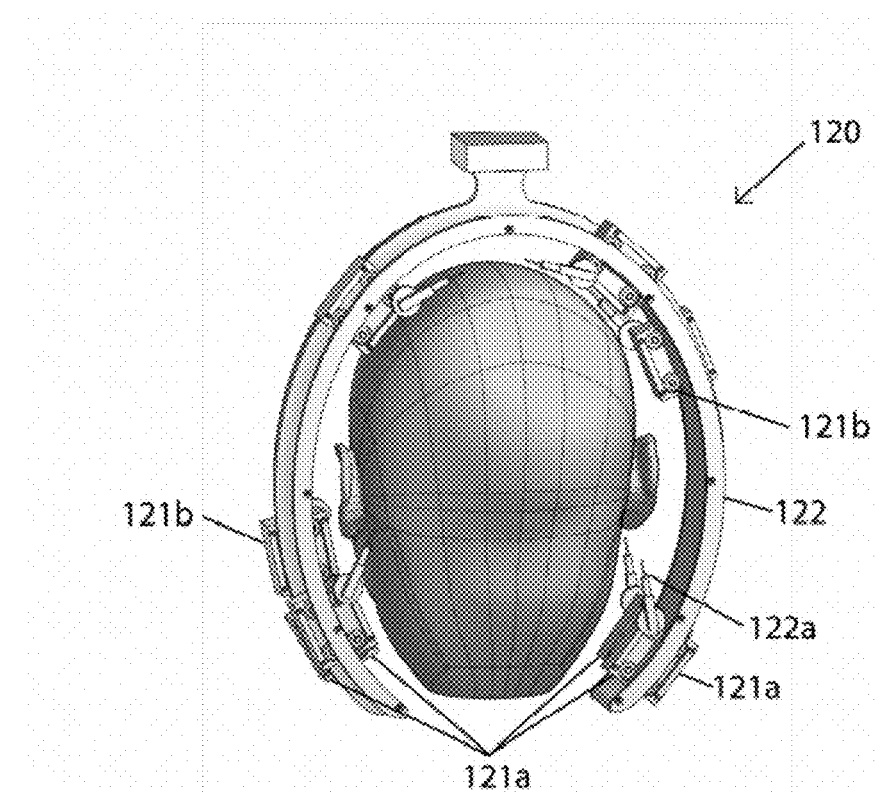
Figure 12C:
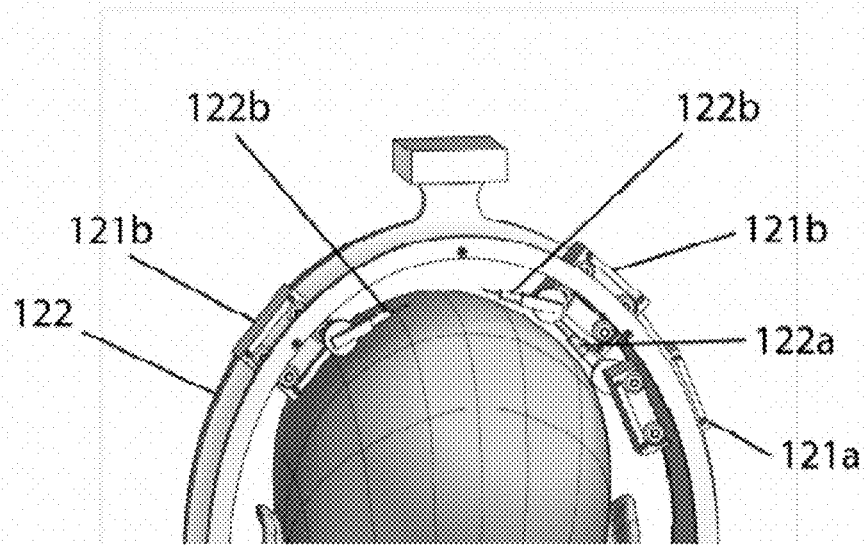

FIGS. 12A-12C show an alternative configuration of an automated hair restoration system, according to an embodiment of the present invention, in which rail guided harvest/transplantation device 120 is employed in lieu of arms 15a and 15b and heads 210 of system 10 (e.g., shown in FIG. 1). Device 120 comprises a plurality of harvest trolleys 121a and transplant trolleys 121b which are configured to travel within an omega shaped guiding rail arch 122 surrounding a patient's head (i.e., adapted to the ellipsoid shape of a human head), wherein rail arch 122 is hinged on a rotatable base 123, enabling the rotation of arch 122 around its hinging axis, thereby the harvest trolleys 121a and transplant trolleys 121b are capable of reaching above any desirable follicle of the patient's scalp, where harvest trolleys 121a comprise harvest needles 122a and transplant trolleys 121b comprise transplanting needles 122b.

Harvest trolleys 121a and transplant trolleys 121b act similar to relay runners, where harvest trolleys 121a harvest follicles (FIG. 12B), delivers the harvested follicles to transplant trolleys 121b (FIG. 12C), and then are free to return and harvest the next follicles at the donor area, thereby enabling a rapid restoration procedure.

Control module 10a can similarly control device 120 to controlling arms 15a-15b and heads 210, while verifying minimal safety distances between each two harvest trolleys 121a and transplant trolleys 121b traveling on the same rail. The harvest/transplant trolleys arrangement of device 120 is suitable to the common type of hair restoration cases in which donor areas are usually located at the lower scalp areas while the thin haired areas are located at the top scalp area.

Figure 13:
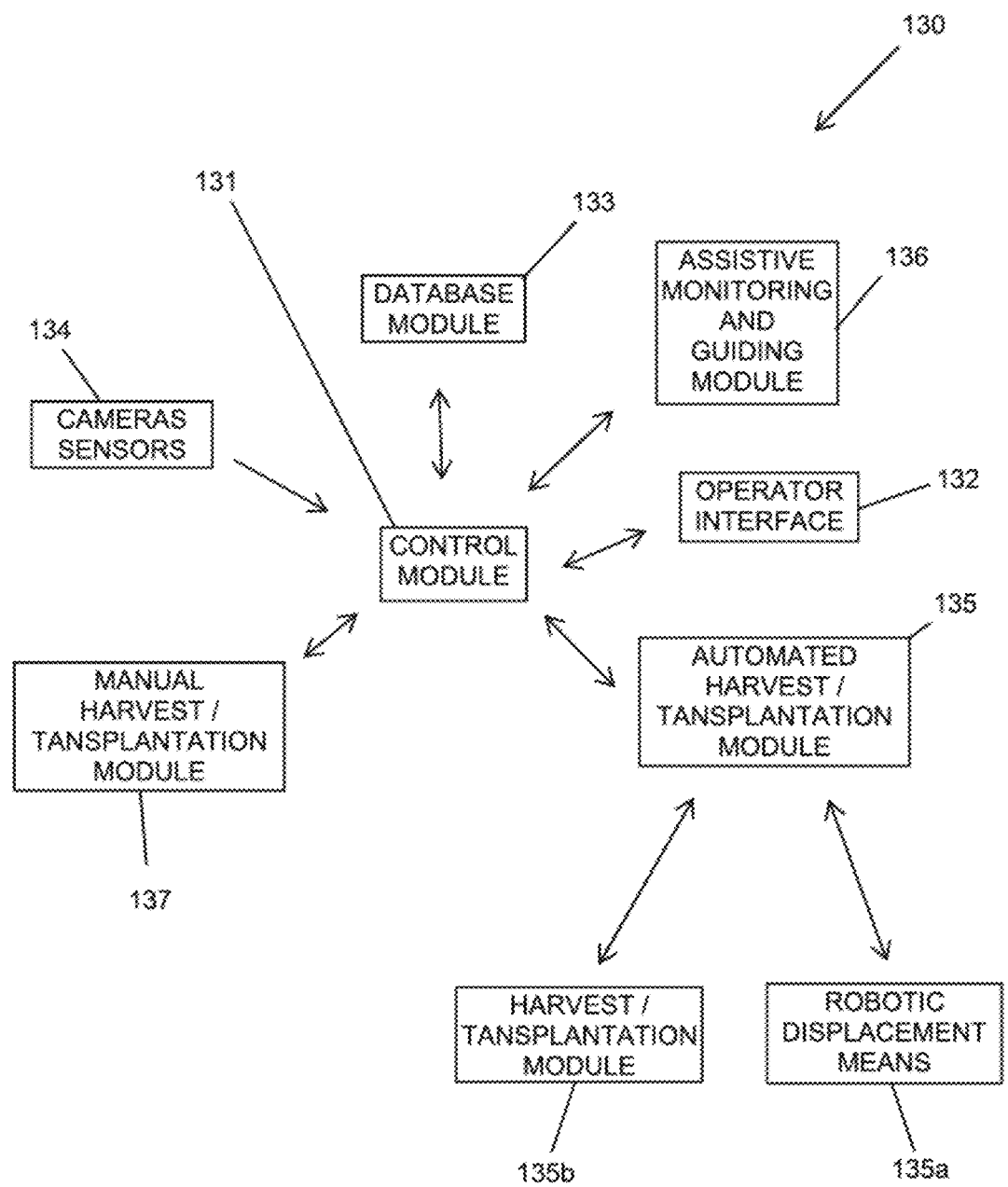
FIG. 13 shows a block diagram of an optional configuration of the proposed system, according to an embodiment of the present invention.

FIG. 13 shows a bloc diagram of an optional configuration of the proposed system, according to an embodiment of the present invention, in which configuration 130 comprises a main control module 131 (which can be managed by operator interface 132) being responsible for the control, operation and managing of the proposed system (e.g., system 10 of FIG. 1), being in communication with a database module 133 which represents different databases utilized by control module to store all the data related to hair follicles database accumulated during a specific procedure performed with a specific patient, further procedures performed with the same patient, and procedures performed with other patients using the same unit of system 10. Database module 133 can also be synchronized with larger scaled databases operated by central computers for sharing clinical data for mass data processing and learning.

When hair is harvested, its status is saved in the hair database of database module 133 (e.g., indicating the hair as "harvested-in-device"), and information is gathered and stored for its integrity after harvesting, as well as its precise location within the proposed system, e.g., stored at specific capsule 102a (shown in FIG. 10) on carousel 102. Optionally, hair may leave the proposed system (e.g., harvested follicle which deteriorates and therefore not transplanted). In this case, the unused hair is disposed and not being tracked anymore and its status indication is, for example, "harvested-out-device". The status of hair that is loaded into the proposed system and intended for implanting, can indicate "transplantation-candidate", hair follicle that has been successfully implanted is indicated as "transplanted", etc.

The first occurrence of hair in database module 133 is after the initial scan performed by cameras and sensors module 134 (e.g., responsible for cameras 17a-17c) after which control module 131 processes acquired images, executes optical analysis to learn patient's hair density areas and identify individual hairs by executing, designating each hair with a unique ID. Alternatively an older scan of a patient's scalp can be loaded to the system (for example, one clinic performing the scan, and another performing the operation). Control module 131 generates scalp 3D mapping comprising each individual hair ID with its optical image, location, spectral data, characterization Hair Ranking Score and an initial status indication (e.g., on-head) and stores it at database module 133. Control module 131 is also responsible for the abovementioned candidate follicles, displacement, and distribution optimizations, according to which control module 131 generates an optimized harvest/transplantation plan also considering safety distances between operating mechanisms of automated harvest/transplantation module 135, which are operated by control module 131 to utilize robotic displacement means module 135a in conjunction with harvest/transplantation module 135b, according to the optimized plan to harvest individual follicles (i.e., having a unique ID and spatial location) displace and transplant them at a desirable target point, updating database module 133 accordingly, and repeating the harvest/transplantation and scanning operations in desirable iterations until a newly generated 3D mapping matches the generated optimized plan. The iterative scanning may also be utilized for on-going updating the optimized plan until control module 10a detects that there is no optimization required with respect to a generated 3D mapping.

Maintaining database 133 storing each individual hair identification together with its inclusive history, comprising characterization, origin location, displacement path (i.e., assuming the specific hair was ranked as qualifying candidate for transplantation) and final location (i.e., excluding hairs that deteriorated post harvesting and hence was not transplanted), can be very useful for follow-up reassessment of the restoration procedure performed by the proposed system, thereby learning of the relationship between the characterization of each hair and its endurance over given period of time, thus improving the ranking predictability of the proposed system. Furthermore, database 133 can be utilized to store information related to donor and target transplantation areas such as the spectral values of skin related pixels, thereby to enable learning of the relationship between these spectral values and successful restoration. Of course, further parameters having predictive value may be identified as the medical and image processing technology advance and provide improved recognition means.

As described in FIGS. 11A-11B an assistive monitoring and guiding module 136 is employed to control assistive monitoring and guiding means providing visual supervision means as well as guiding means (e.g., lasers 110 of FIG. 11A) which can provide, for example, continuous marking onto a target transplantation point which can be read by suitable sensors (i.e., integrated in cameras and sensors module 134) in communication with control module 131, which compares the location of the detected marking to the current position of transplanting needle 107 (shown in FIG. 10), before transplanting a corresponding follicle. The guiding means of module 136 can also be utilized for guiding manual operations where needed. In this case, a manual harvest/transplantation module 137 is utilized for mediating between a manual harvest/transplantation device and the operation of the proposed system, for example utilizing the guiding means of module 136, updating database module 133 with a newly harvested follicle, or with a transplanted follicle (e.g., by utilizing operator interface module 132).

Figure 14:
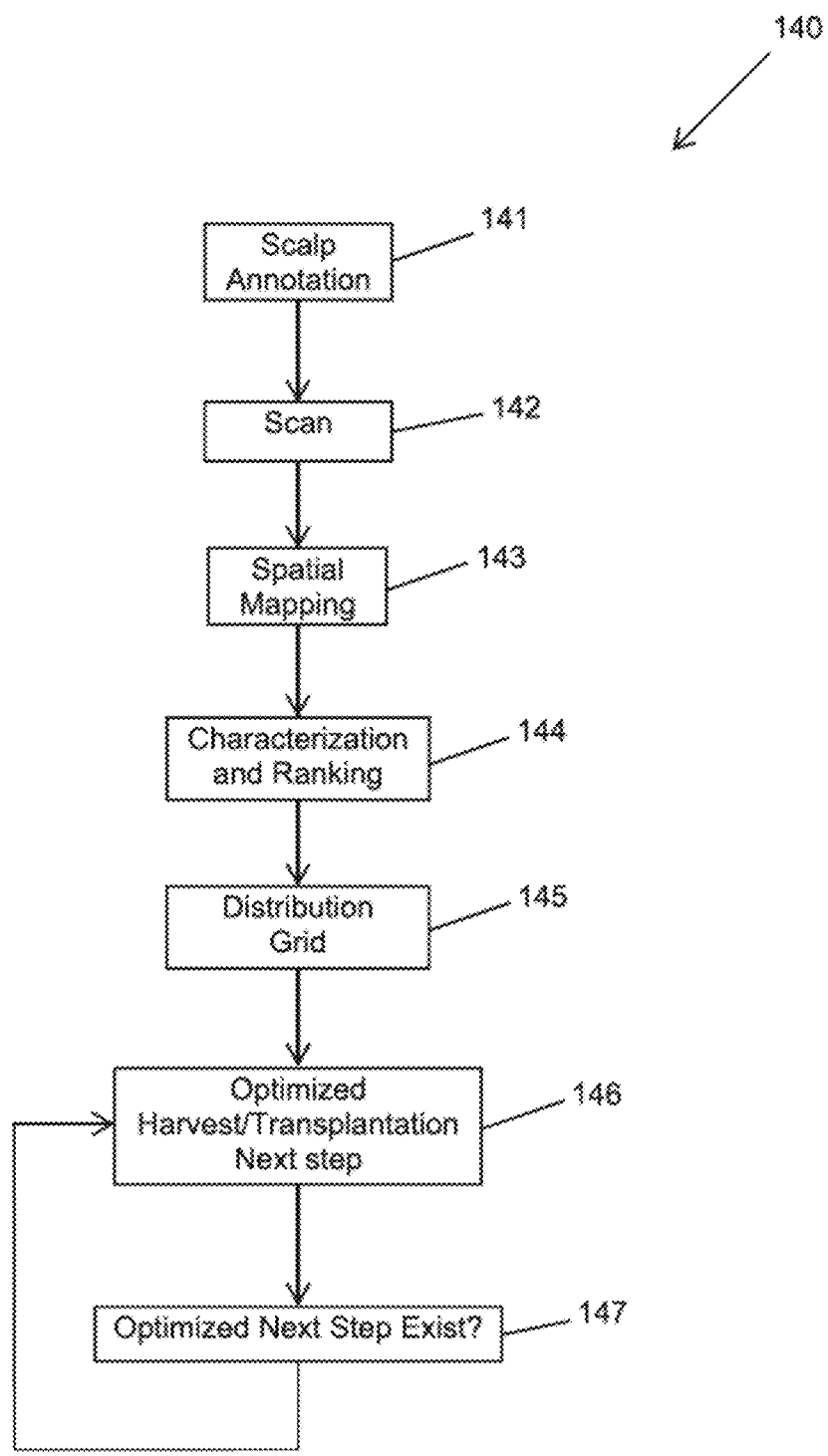
FIG. 14 is a block diagram illustrating an exemplary flow chart of a restoration process, according to an embodiment of the present invention.

FIG. 14 is a block diagram illustrating an exemplary flow chart of a restoration process, according to an embodiment of the present invention, in which a restoration process 140 begins with a patient stably positioned and the medical personnel annotate patient's head with relative reference points and with borderlines of donor (block 141), bold and thin haired areas (for visual recognition and tracking by system 10), followed by an initial optical and/or thermal scan (block 142) of the patient's scalp, where the acquired images are processed by control module 10a to spatially map scalp (block 143) identifying donor areas, target transplantation areas, and non-relevant areas and locate, identify, characterize and rank candidate hair follicles for transplantation (block 144). The system uses optical and/or thermal techniques to recognize the location of hair follicles on the patient's head, where all the identified follicles' ranking and positioning is incorporated into a distribution grid (block 145) which is used as a basis for distribution optimization calculation (block 146) resulting with an optimized transplantation plan (block 147), which is iteratively updated (block 148) as recurring harvest and transplantation steps takes place until uniform distribution of hair is achieved.

The annotation of patient's head (block 141) provides reference points for the proposed system, by which an initial calibration of the coordinate systems is enabled, making the proposed system unsusceptible to slight patient's movements between harvest/transplantation operations (i.e., during which fixation arms 14 of FIG. 1 stably hold the patient's head). Furthermore, the annotation of patient's head (block 141) and initial calibration of coordinate systems enables desirable/planned recesses in the restoration procedure, whereas the procedure proceeds an initial calibration takes place by scanning the patient's scalp by scanner 17, and processing the acquired images to identify the annotated reference points (block 141) and calibrate the proposed system to the original coordinate system.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:

1. An automated system for performing hair restoration, comprising:
 a) at least one automated harvest means, comprising a harvesting needle mechanism and a temporal storage means for harvested follicles;
 b) at least one automated transplanting means, comprising a transplanting needle mechanism and said temporal storage means, from which harvested follicles are extracted for transplantations;
 c) at least one displacement means, being one or more rail guided trolleys configured to travel in a guiding rail of an omega shaped rotatable guiding rails arch comprising one or more guiding rails, onto which one of the at least one automated harvest means or one of the at least one automated transplanting means are movably connected for being displaced to desirable harvest or transplantation target points of a patient head;
 d) two or more image acquisition means for acquiring images of a patient's scalp;
 e) one or more mechanical support means for supporting and stabilizing the patient and the patient's head during a hair restoration procedure; and
 f) a control module, comprising data processing and storage hardware and software configured to receive and process images acquired by the two or more image acquisition means by image processing algorithms, map the initial patient's hair distribution, identify and store information related to identified hair follicles and qualifying candidate follicles for transplantation, and finally to generate an optimized harvest and transplantation plan considering aesthetic, efficiency and safety optimization parameters, wherein said control module is further configured to operate the at least one automated harvest means, the at least one automated transplantation means and the at least one displacement means to harvest and to transplant hair follicles in accordance with the generated optimized harvest and transplantation plan.

2. The system according to claim 1, in which the one or more mechanical support means comprise a chair with a backrest, on which the patient sits during restoration procedure, and at least two fixation means for holding the patient's head stabilized during the hair restoration procedure.

3. The system according to claim 1, further comprising a Human-Machine Interface device through which said system can be managed, maintained, and operated manually where needed.

4. The system according to claim 1, in which the at least one automated harvest means and the corresponding at least one automated transplanting means are integrated into one or more automated heads performing harvesting and transplanting operations.

5. The system according to claim 4, in which the temporal storage means is a rotatable carousel comprising a plurality of follicle capsules, wherein by rotating the rotatable carousel a desirable capsule is being aligned with the needle mechanism for receiving and storing a harvested follicle, or an occupied capsule is being aligned with the transplanting needle mechanism enabling a stored follicle to be picked by the transplanting needle mechanism to be transplanted.

6. The system according to claim 4, in which the one or more automated harvesting and transplanting heads employs a follicle camera for monitoring the status of stored follicles, and for verifying harvesting and transplantation locations.

7. The system according to claim 1, in which the at least one displacement means is a robotic arm.

8. The system according to claim 1, in which two or more of the one or more rail guided trolleys are configured to travel within the guiding rail, wherein a first rail guided trolley onto which the automated harvest means is configured to perform harvest operation, and to relay the harvested follicle to a second rail guided trolley onto which the automated transplanting means is movably connected.

9. The system according to claim 1, further comprising a laser marking means, augmented reality headset, or any combination thereof, for supervising and assisting automated harvesting/transplantation operations.

10. The system according to claim 1, in which the two or more image acquisition means comprise a scanning camera for acquiring two-dimensional images and a formation of two local cameras uniformly directed to a patient's head while 60% of fields of view thereof overlap, wherein the control module is configured to perform an integrated photogrammetric processing of images acquired by said formation of two local cameras, thereby to generate spatial positioning information of each individual hair, for mapping of a patient's scalp and hair deployment.

11. The system according to claim 1, in which the harvesting needle mechanism comprises a harvesting needle which concentrically moves inside a sharpened sleeve that functions as a drill for uprooting follicles and the transplanting needle mechanism comprises a transplanting needle which is concentrically slide inside a sharpened sleeve that functions as a linear guide for directing harvested follicles to points of insertion in a donated area.

12. A method for performing hair restoration, comprising:
    a) providing at least one automated harvest means, comprising a harvesting needle mechanism and a temporal storage means for harvested follicles;
    b) providing at least one automated transplanting means, comprising a transplanting needle mechanism and said temporal storage means from which harvested follicles are extracted for transplantations;
    c) providing at least one displacement means, being one or more rail guided trolleys configured to travel in a guiding rail of an omega shaped rotatable guiding rails arch comprising one or more guiding rails, onto which one of the at least one automated harvest means or one of the at least one automated transplanting means are movably connected for being displaced to desirable harvest or transplantation target points of a patient head;
    d) providing two or more image acquisition means for acquiring images of a patient's scalp;
    e) providing one or more mechanical support means for supporting and stabilizing the patient and the patient's head during the hair restoration procedure; and
    f) providing a control module, for controlling said at least one automated harvest means, said at least one automated transplanting means, said at least one displacement means, and said two or more image acquisition means, said control module for processing acquired images and for storing processed information;
    g) stably positioning a patient to be supported by said one or more mechanical support means;
    h) annotating the patient's scalp with reference points and borderlines of scalp areas of different hair density;
    i) scanning the patient's head by said two or more image acquisition means for collecting inclusive imaging of the patient's scalp;
    j) processing images acquired by image processing algorithms executed by said control module for identifying scalp bald areas, thin haired areas, dense haired areas, as well as identifying qualifying candidate follicles for transplantation, thereby generating an initial mapping of the patient's scalp;
    k) generating an optimized harvest and transplantation plan considering aesthetic, efficiency and safety optimization parameters, by executing corresponding optimization algorithms;
    l) Operating the at least one automated harvest means, the at least one automated transplanting means and the at least one displacement means to harvest and to transplant hair follicles in accordance with the generated optimized harvest and transplantation plan, while repeating steps h)-i) until the mapping of the patient's scalp at step i) is completed; and
    m) storing information related to the patient's scalp, to identified hair follicles and qualifying candidate follicles for transplantation, where each of the identified hair follicles is distinguished by a unique identification.

13. The method according to claim 12, wherein the identifying qualifying candidate follicles for transplantation is performed by using image processing algorithms for characterizing each identified qualifying follicle followed by ranking said characterized follicles, where the highest ranked follicles are considered as candidates for transplantation.

14. The method according to claim 13, wherein the identified qualifying follicles are characterized with respect to parameters selected from the group consisting of: hair thickness, hair darkness, hair angle with respect to the patient's scalp, follicle bulb, amount of tissue on a harvested hair, or any combination thereof.

15. The method according to claim 13, in which the aesthetic optimization parameters are selected from the group consisting of: uniform hair distribution, hair shade, or any combination thereof.

16. The method according to claim 12, in which the efficiency optimization parameters are selected from the group consisting of: minimum possible displacement of follicles, minimizing displacement path conflicts, or any combination thereof.

17. The method according to claim 13, in which the safety optimization algorithm constantly calculates the instantaneous distance between the closest portions of moving and stationary components of a restoration system, in order to maintains a minimal distance which exceeds a predetermined safety distance, so as to prevent any potential collision.

18. The method according to claim 13, wherein ranking each individual hair from the donor area is performed by:
    a) performing a combination of visual, spectral and thermal analysis;
    b) assigning a corresponding weight to each type of analysis;

c) performing data fusion of all the collected data types.

19. An automated system for performing hair restoration, comprising:
   a) at least one automated harvest means, comprising a harvesting needle mechanism comprising a harvesting needle which concentrically moves inside a sharpened sleeve that functions as a drill for uprooting follicles, and a temporal storage means for harvested follicles;
   b) at least one automated transplanting means, comprising a transplanting needle mechanism and said temporal storage means, from which harvested follicles are extracted for transplantations, and the transplanting needle mechanism comprises a transplanting needle which is concentrically slide inside a sharpened sleeve that functions as a linear guide for directing harvested follicles to points of insertion in a donated area;
   c) at least one displacement means, onto which one of the at least one automated harvest means or one of the at least one automated transplanting means are movably connected for being displaced to desirable harvest or transplantation target points of a patient head;
   d) two or more image acquisition means for acquiring images of a patient's scalp;
   e) one or more mechanical support means for supporting and stabilizing the patient and the patient's head during a restoration procedure; and
   f) a control module, comprising data processing and storage hardware and software configured to receive and process images acquired by the two or more image acquisition means by image processing algorithms, map the initial patient's hair distribution, identify and store information related to identified hair follicles and qualifying candidate follicles for transplantation, and finally to generate an optimized harvest and transplantation plan considering aesthetic, efficiency and safety optimization parameters, wherein said control module is further configured to operate the at least one automated harvest means, the at least one automated transplantation means and the at least one displacement means to harvest and to transplant hair follicles in accordance with the generated optimized harvest and transplantation plan.

20. A method for performing hair restoration, comprising:
   a) providing at least one automated harvest means, comprising a harvesting needle mechanism and a temporal storage means for harvested follicles;
   b) providing at least one automated transplanting means, comprising a transplanting needle mechanism and said temporal storage means from which harvested follicles are extracted for transplantations;
   c) providing at least one displacement means, onto which one of the at least one automated harvest means or one of the at least one automated transplanting means are movably connected for being displaced to desirable harvest or transplantation target points of a patient head;
   d) providing two or more image acquisition means for acquiring images of a patient's scalp;
   e) providing one or more mechanical support means for supporting and stabilizing the patient and the patient's head during the hair restoration procedure; and
   f) providing a control module, for controlling said at least one automated harvest means, said at least one automated transplanting means, said at least one displacement means, and said two or more image acquisition means, said control module for processing acquired images and for storing processed information;
   g) stably positioning a patient to be supported by said one or more mechanical support means;
   h) annotating the patient's scalp with reference points and borderlines of scalp areas of different hair density;
   i) scanning the patient's head by said two or more image acquisition means for collecting inclusive imaging of the patient's scalp;
   j) processing images acquired by image processing algorithms executed by said control module for identifying scalp bald areas, thin haired areas, dense haired areas, as well as identifying qualifying candidate follicles for transplantation, thereby generating an initial mapping of the patient's scalp;
   k) generating an optimized harvest and transplantation plan considering aesthetic, efficiency and safety optimization parameters, by executing corresponding optimization algorithms;
   l) Operating the at least one automated harvest means, the at least one automated transplanting means and the at least one displacement means to harvest and to transplant hair follicles in accordance with the generated optimized harvest and transplantation plan, while repeating steps h)-i) until the mapping of the patient's scalp at step i) is completed; and
   m) storing information related to the patient's scalp, to identified hair follicles and qualifying candidate follicles for transplantation, where each of the identified hair follicles is distinguished by a unique identification.

21. The method according to claim 20, wherein the at least one displacement means are one or more rail guided trolleys configured to travel in a guiding rail of an omega shaped rotatable guiding rails arch comprising one or more guiding rails.

* * * * *